(12) United States Patent
Kim et al.

(10) Patent No.: US 12,136,770 B2
(45) Date of Patent: Nov. 5, 2024

(54) ANTENNA AND ELECTRONIC DEVICE INCLUDING SAME

(71) Applicant: SAMSUNG ELECTRONICS CO., LTD., Suwon-si (KR)

(72) Inventors: Kyungbin Kim, Suwon-si (KR); Kwangseo Kim, Suwon-si (KR); Jiho Kim, Suwon-si (KR); Seongyong An, Suwon-si (KR); Chongo Yoon, Suwon-si (KR); Gyubok Park, Suwon-si (KR); Jinwoo Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 202 days.

(21) Appl. No.: 17/860,850

(22) Filed: Jul. 8, 2022

(65) Prior Publication Data
US 2022/0344837 A1 Oct. 27, 2022

Related U.S. Application Data

(63) Continuation of application No. PCT/KR2021/000586, filed on Jan. 15, 2021.

(30) Foreign Application Priority Data

Jan. 20, 2020 (KR) ........................ 10-2020-0007069

(51) Int. Cl.
*H01Q 21/28* (2006.01)
*H01Q 1/24* (2006.01)
(Continued)

(52) U.S. Cl.
CPC ............ *H01Q 21/28* (2013.01); *H01Q 1/243* (2013.01); *H01Q 3/34* (2013.01); *H01Q 9/0414* (2013.01); *H01Q 21/0087* (2013.01)

(58) Field of Classification Search
CPC .......... H01Q 21/28; H01Q 1/243; H01Q 3/34; H01Q 9/0414; H01Q 21/0087
See application file for complete search history.

(56) References Cited

U.S. PATENT DOCUMENTS 9,559,405 B2   1/2017 Sorrell et al.
2013/0017867 A1*  1/2013 Lee ........................ H01Q 7/06
                                                 455/566
(Continued)

FOREIGN PATENT DOCUMENTS

JP      2015-122657 A    7/2015
KR  10-2014-0127913 A   11/2014
(Continued)

OTHER PUBLICATIONS

International Search Report dated Apr. 23, 2021 issued by the International Searching Authority in counterpart International Application No. PCT/KR2021/000586 (PCT/ISA/210).
(Continued)

*Primary Examiner* — Graham P Smith
(74) *Attorney, Agent, or Firm* — Sughrue Mion, PLLC

(57) ABSTRACT

An electronic device includes a housing including an internal space, a display disposed in the internal space, the display being visible from an outside of the electronic device through at least a part of the housing, at least one first antenna disposed in the internal space, a second antenna disposed in the internal space and wound multiple times and including a conductive pattern disposed to be spaced apart from the first antenna, a first wireless communication circuit configured to transmit or receive a wireless signal in a first frequency band via the at least one first antenna, and a second wireless communication circuit configured to transmit or receive a wireless signal in a second frequency band via the second antenna, wherein the at least one first antenna is spaced apart by a distance from the conductive pattern.

18 Claims, 23 Drawing Sheets

(51) Int. Cl.
   *H01Q 3/34*    (2006.01)
   *H01Q 9/04*    (2006.01)
   *H01Q 21/00*   (2006.01)

(56) References Cited

U.S. PATENT DOCUMENTS

| | | |
|---|---|---|
| 2014/0327587 A1 | 11/2014 | Won |
| 2015/0044963 A1 | 2/2015 | Konanur et al. |
| 2018/0277933 A1 | 9/2018 | Kim et al. |
| 2019/0074601 A1 | 3/2019 | Kim et al. |

FOREIGN PATENT DOCUMENTS

| | | |
|---|---|---|
| KR | 10-2014-0130785 A | 11/2014 |
| KR | 10-1671461 B1 | 11/2016 |
| KR | 10-2017-0105855 A | 9/2017 |
| KR | 10-1878162 B1 | 7/2018 |

OTHER PUBLICATIONS

International Written Opinion dated Apr. 23, 2021 issued by the International Searching Authority in counterpart International Application No. PCT/KR2021/000586 (PCT/ISA/237).
Communication dated Feb. 16, 2024, issued by the Korean Intellectual Property Office in Korean Application No. 10-2020-0007069.

\* cited by examiner

ANTENNA AND ELECTRONIC DEVICE INCLUDING SAME

CROSS-REFERENCE TO RELATED APPLICATION(S)

This application is a bypass continuation of PCT International Application No. PCT/KR2021/000586 filed on Jan. 15, 2021, which is based on and claims priority under 35 U.S.C. § 119 to Korean Patent Application No. 10-2020-0007069 filed on Jan. 20, 2020, in the Korean Intellectual Property Office, the disclosures of which are incorporated by reference herein in their entirety.

BACKGROUND

1. Field

Various embodiments of the disclosure relate to an antenna and an electronic device including the same.

2. Description of Related Art

An electronic device may include at least one antenna for supporting wireless communication services in various frequency bands. The at least one antenna may be disposed in the inner space of the electronic device so as to exhibit an excellent radiation performance without being affected by structures or electronic components disposed nearby.

An antenna used for an electronic device may include multiple antennas mounted in the inner space of the electronic device according to the service-specific frequency, bandwidth, or type. The multiple antennas may include an ultra-high frequency antenna operating in a low band of about 700 MHz to about 900 MHz, a mid-band of about 1700 MHz to about 2100 MHz, or a high band of about 2300 MHz to about 2700 MHz, or a millimeter-wave antenna operating in about 3 GHz to about 100 GHz. As another example, the electronic device may include antennas for providing various wireless communication services such as BT (bluetooth), GPS (global positioning system), or WIFI (wireless fidelity).

As another example, electronic devices commonly used for wireless communication with far-ocean fishing ships, military communication, ionosphere observation, solar wind observation, or amateur (ham) radio communication may include high frequency (HF) antennas using the ionosphere in a frequency range of 3 MHz to 30 MHz.

However, an electronic device using a high-frequency antenna and an electronic device using an ultra-high frequency (for example, legacy band) or millimeter waves are not used together, and this may result in a problem in that an electronic device for mobile communication and an electronic device for high frequencies need to be provided separately. Moreover, the electronic device including a high-frequency antenna may fail to use various functions of the electronic device for mobile communication, such as a smartphone or tablet.

Various embodiments of the disclosure may provide an antenna and an electronic device including the same.

Various embodiments of the disclosure may provide an electronic device including an antenna capable of using a high frequency, an ultra-high frequency for mobile communication, or a millimeter wave together.

SUMMARY

According to various embodiments, an electronic device may include a housing including an internal space, a display disposed in the internal space, the display being visible from an outside of the electronic device through at least a part of the housing, at least one first antenna disposed in the internal space, a second antenna disposed in the internal space and wound multiple times and including a conductive pattern disposed to be spaced apart from the first antenna, a first wireless communication circuit configured to transmit or receive a wireless signal in a first frequency band via the at least one first antenna, and a second wireless communication circuit configured to transmit or receive a wireless signal in a second frequency band via the second antenna, wherein the at least one first antenna is spaced apart by a distance from the conductive pattern.

The first wireless communication circuit may be configured to transmit or receive a wireless signal in a range of 400 MHz-3000 MHz via the at least one first antenna.

The designated distance may be at least 2.5 mm.

The second wireless communication circuit may be configured to transmit or receive a wireless signal in a range of 3 MHz-30 MHz via the second antenna.

The electronic device may further include at least one third antenna disposed in the internal space and spaced apart from the second antenna; and a third wireless communication circuit configured to transmit or receive a wireless signal in a third frequency band via the at least one third antenna.

The third wireless communication circuit may be configured to transmit or receive a wireless signal in a range of about 3 GHz-100 GHz via the at least one third antenna.

The third antenna may include a substrate, and a plurality of antenna elements arranged at intervals on the substrate and configured to form a beam pattern in a direction.

The second antenna may further include a portion formed via at least a part of the conductive pattern and spaced apart by a distance from the third antenna.

The electronic device may further include an antenna carrier disposed in the internal space, and the conductive pattern may be wound multiple times along an edge of the antenna carrier.

The antenna carrier may include a body including a first surface facing a first direction, a second surface facing a direction opposite to the first direction, and a side surface surrounding a space between the first surface and the second surface, and the conductive pattern may be wound multiple times along at least a part of the side surface.

The conductive pattern may extend to at least a part of the first surface and the second surface from the side surface.

The electronic device may further include at least one flange protruding from at least a part of the body, and the first antenna may be disposed in the at least one flange.

The conductive pattern may include a first wound portion, a second wound portion, a third wound portion and a fourth wound portion which are wound along the side surface and sequentially spaced apart from one another, and a distance between two adjacent wound portions among the first wound portion, the second wound portion, the third wound portion and the fourth wound portion may be partially changed along the side surface.

The conductive pattern may include a first wound portion, a second wound portion, a third wound portion and a fourth wound portion which are wound along the side surface and sequentially spaced apart from one another, and a first distance between the first wound portion and the second wound portion, a second distance between the second wound portion and the third wound portion, and a third distance between the third wound portion and the fourth wound portion may be substantially the same with each other.

The conductive pattern may include a first wound portion, a second wound portion, a third wound portion and a fourth wound portion which are wound along the side surface and sequentially spaced apart from one another, and a first distance between the first wound portion and the second wound portion may be larger than each of a second distance between the second wound portion and the third wound portion and a third distance between the third wound portion and the fourth wound portion.

The conductive pattern may include a first wound portion, a second wound portion, a third wound portion and a fourth wound portion which are wound along the side surface and sequentially spaced apart from one another, and a second distance between the second wound portion and the third wound portion may be larger than each of a first distance between the first wound portion and the second wound portion and a third distance between the third wound portion and the fourth wound portion.

The conductive pattern may include a first wound portion, a second wound portion, a third wound portion and a fourth wound portion which are wound along the side surface and sequentially spaced apart from one another, and a third distance between the third wound portion and the fourth wound portion may be larger than each of a first distance between the first wound portion and the second wound portion and a second distance between the second wound portion and the third wound portion.

The at least one first antenna may include at least one laser direct structuring (LDS) pattern disposed on the at least one flange.

The conductive pattern may include a plurality of wound portions, and at least two lines of respective lines of the plurality wound portions have intervals which are identical or not identical to each other.

The housing may include a side frame, and the conductive pattern may be wound multiple times along an internal edge of the side frame.

BRIEF DESCRIPTION OF THE DRAWINGS

The above and other aspects, features, and advantages of certain embodiments of the present disclosure will be more apparent from the following description taken in conjunction with the accompanying drawings.

DETAILED DESCRIPTION

Figure 1:
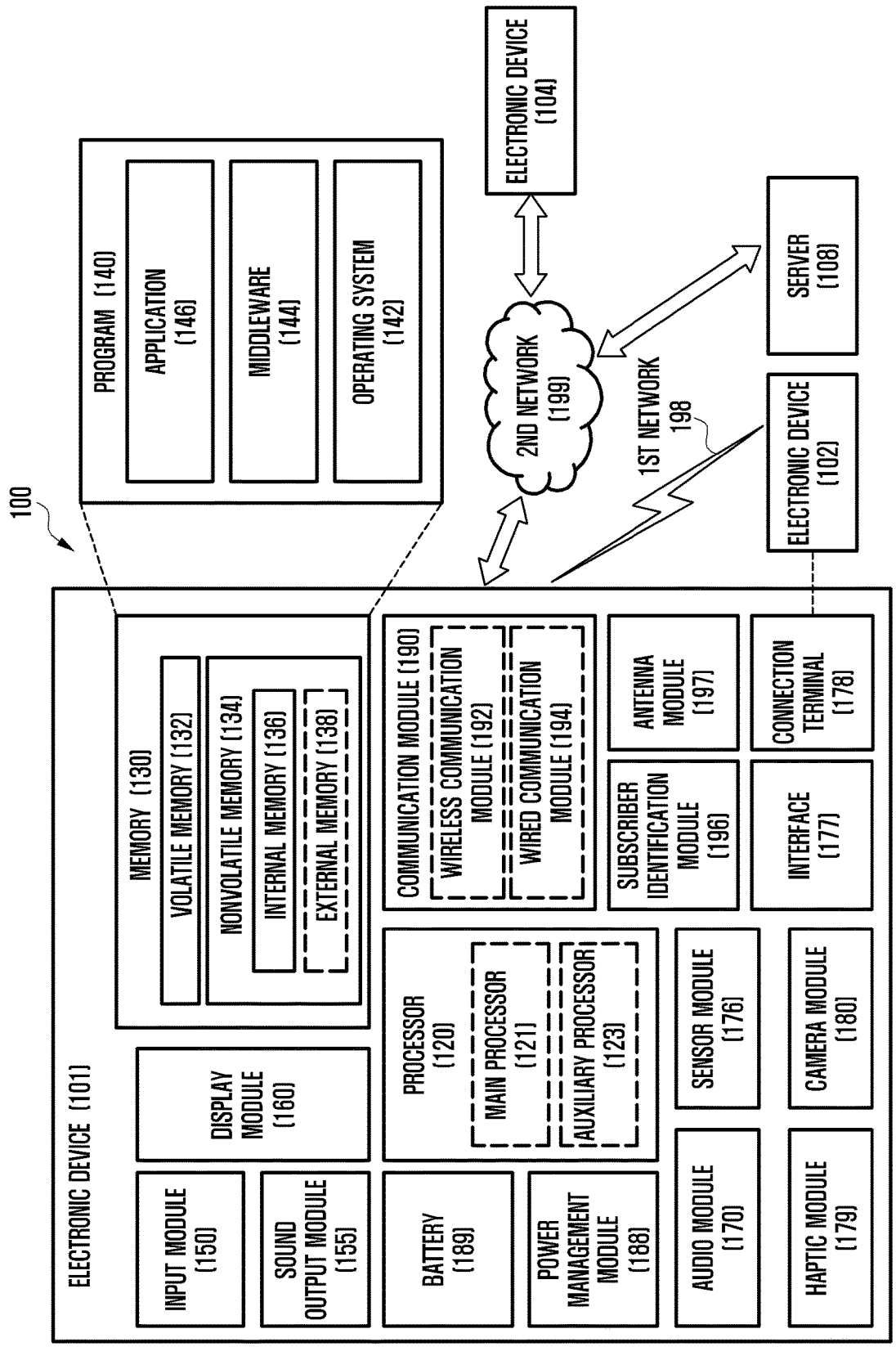
FIG. 1 is a block diagram of an electronic device in a network environment according to various embodiments of the disclosure.

FIG. 1 illustrates an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in nonvolatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the nonvolatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to an embodiment may be one of various types of electronic devices. The electronic device may include a portable communication device (e.g., a smart phone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as a memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
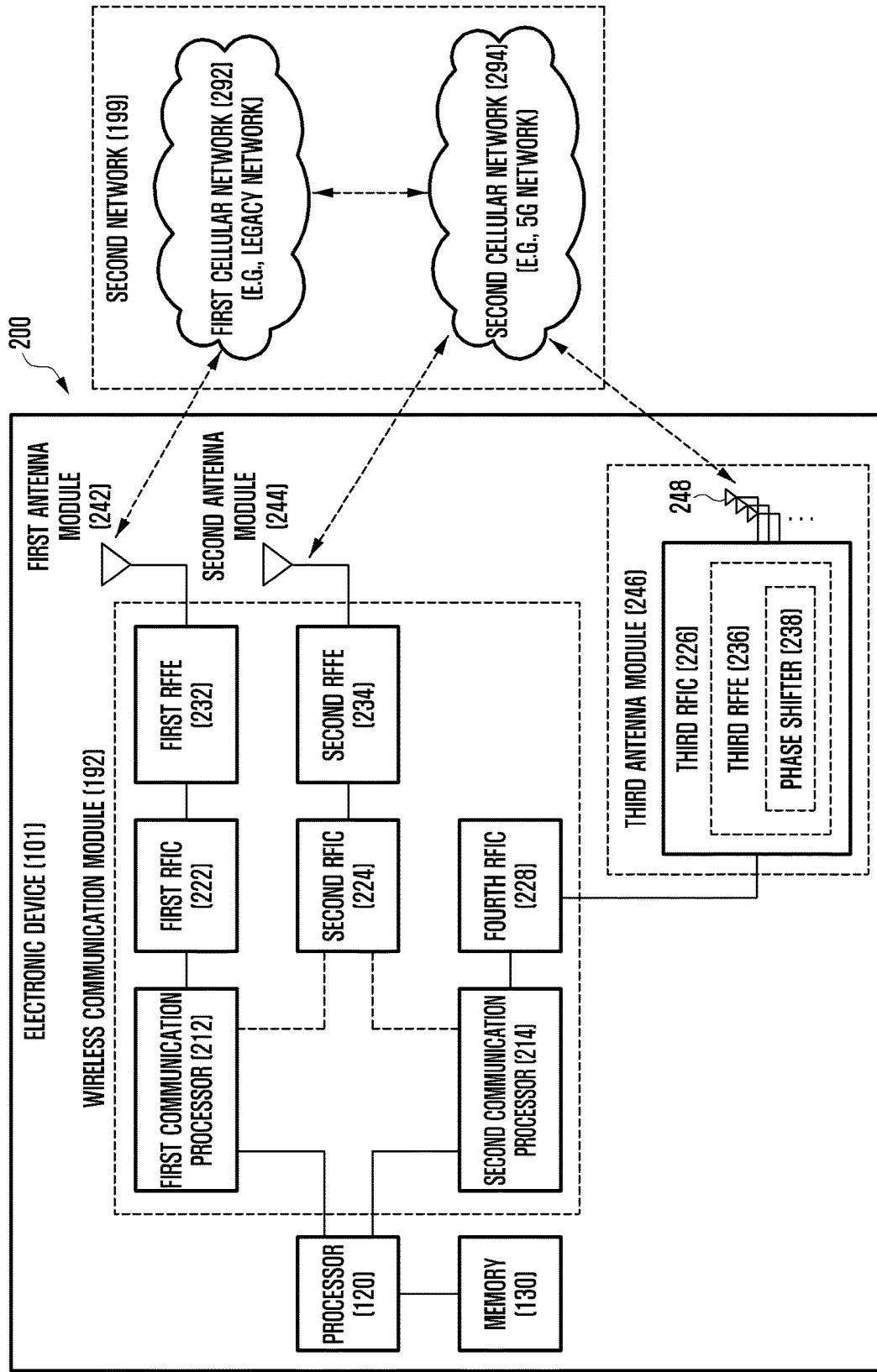
FIG. 2 is a block diagram of an electronic device for supporting legacy network communication and 5G network communication according to various embodiments of the disclosure.

FIG. 2 is a block diagram illustrating an electronic device in a network environment including a plurality of cellular networks according to various embodiments of the disclosure.

Referring to FIG. 2, the electronic device 101 may include a first communication processor 212, second communication processor 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to another embodiment, the electronic device 101 may further include at least one of the components described with reference to FIG. 1, and the second network 199 may further include at least one other network. According to one embodiment, the first communication processor 212, second communication processor 214, first RFIC 222, second RFIC 224, fourth RFIC 228, first RFFE 232, and second RFFE 234 may form at least part of the wireless communication module 192. According to another embodiment, the fourth RFIC 228 may be omitted or included as part of the third RFIC 226.

The first communication processor 212 may establish a communication channel of a band to be used for wireless communication with the first cellular network 292 and support legacy network communication through the established communication channel. According to various embodiments, the first cellular network may be a legacy network including a second generation (2G), 3G, 4G, or long term evolution (LTE) network. The second communication processor 214 may establish a communication channel corresponding to a designated band (e.g., about 6 GHz to about 60 GHz) of bands to be used for wireless communication with the second cellular network 294, and support 5G network communication through the established communication channel. According to various embodiments, the second cellular network 294 may be a 5G network defined in 3GPP. Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to one embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to one embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to one embodiment, the first RFIC 222 and the second RFIC 224 may be implemented into at least part of a single package or a single chip. According to one embodiment, the first RFFE 232 and the second RFFE 234 may be implemented into at least part of a single package or a single chip. According to one embodiment, at least one of the first antenna module 242 or the second antenna module 244 may be omitted or may be combined with another antenna module to process RF signals of a corresponding plurality of bands.

According to one embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof, thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to one embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3A:
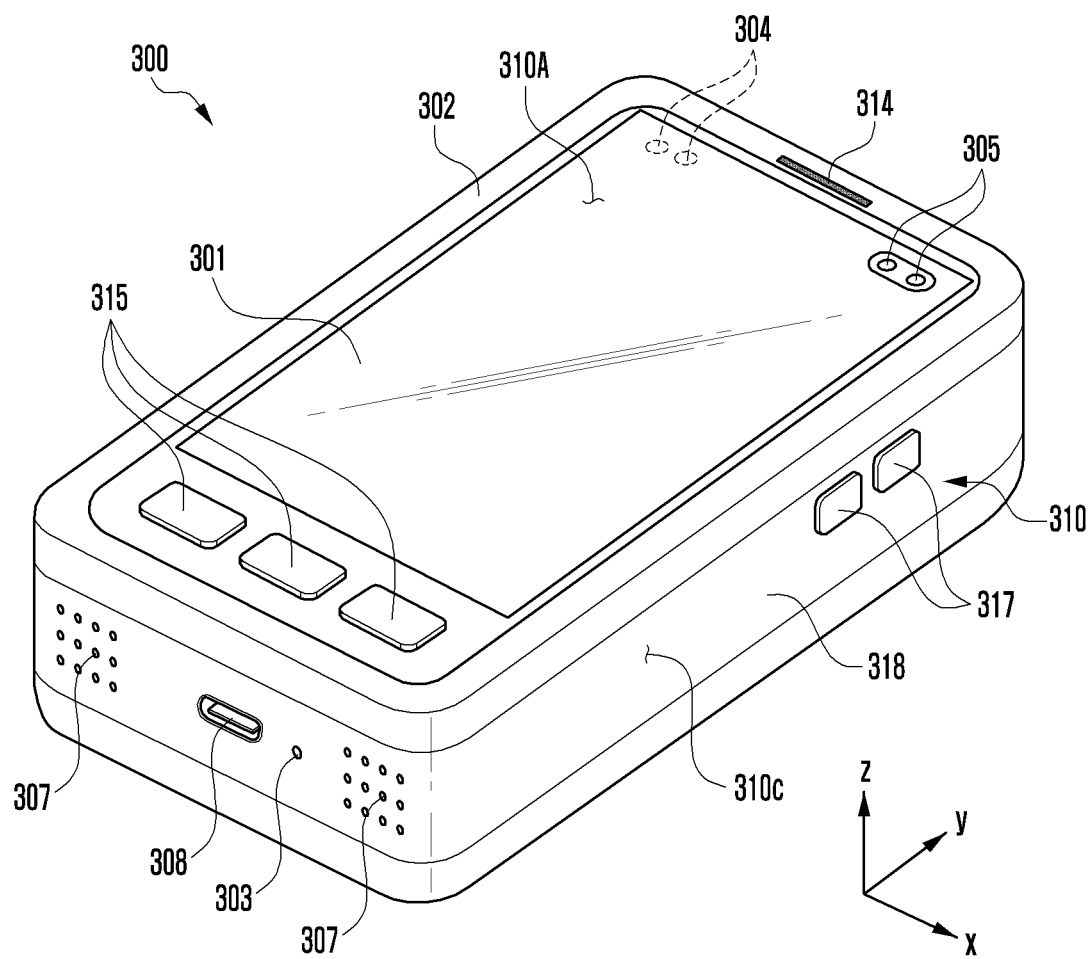
FIG. 3A is a perspective view of an electronic device according to various embodiments of the disclosure.
Figure 3B:
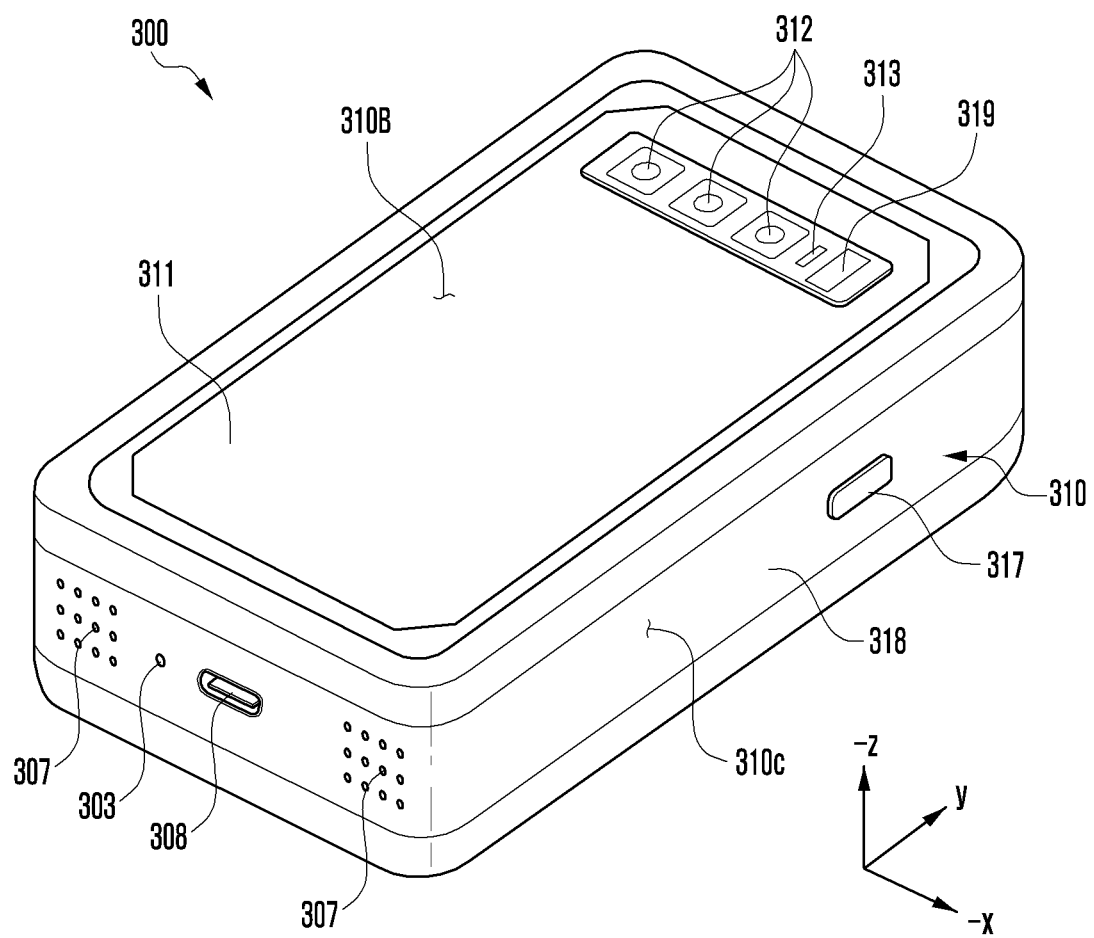
FIG. 3B is a rear perspective view of an electronic device according to various embodiments of the disclosure.

FIG. 3A is a perspective view of a front surface of an electronic device 300 according to various embodiments of the disclosure. FIG. 3B is a perspective view of a rear surface of the electronic device 300 according to various embodiments of the disclosure.

The electronic device 300 of FIG. 3A and FIG. 3B may be at least partially similar to the electronic device 101 of FIG. 1, or may further include other embodiments of an electronic device.

Referring to FIG. 3A and FIG. 3B, the electronic device 300 according to an embodiment may include a housing 310 including a first surface 310A (e.g., a front surface), a second surface 310B (e.g., a rear surface), and a side surface 310C surrounding a space between the first surface 310A and the second surface 310B. In another embodiment (not illustrated), the term "housing 310" may refer to a structure forming a part of the first surface 310A, the second surface 310B, and the side surface 310C of FIGS. 3A and 3B. According to an embodiment, at least a portion of the first surface 310A may be defined by a substantially transparent front plate 302 (e.g., a glass plate or a polymer plate including various coating layers). The second surface 310B may be defined by a substantially opaque rear plate 311. The rear plate 311 may be made of, for example, coated or colored glass, ceramic, a polymer, a metal (e.g., aluminum, stainless steel (STS), or magnesium), or a combination of two or more of these materials. The side surface 310C may be defined by a side bezel structure 318 (e.g., a side member or a side frame) coupled to the front plate 302 and the rear plate 311 and including a metal or a polymer. In some embodiments, the rear plate 311 and the side bezel structure 318 may be integrally formed, and may include the same material (e.g., a metal material such as aluminum).

In another embodiment, the front plate 302 may include, at the long opposite side edges of the front plate 302, a first curved surface area which is bent from the first surface 310A toward the rear plate 311 and extends seamlessly. In another embodiment, the rear plate 311 may include, at the long opposite side edges thereof, a second curved surface area which is bent from the second surface 310B toward the front plate 302 and extends seamlessly. In some embodiments, the front plate 302 or the rear plate 311 may include only one of the first curved surface area or the second curved surface area. In some embodiments, the front plate 302 may include only a flat surface disposed parallel to the second surface 310B without including the first curved surface area and the second curved surface area. In the embodiments described above, when viewed from the side of the electronic device 300, the side bezel structure 318 may have a first thickness (or width) on the side surface portions that do not include the first curved surface area and the second curved surface area, and may have a second thickness, which is smaller than the first thickness, on the side surface portions that include the first curved surface area and the second curved surface area.

According to an embodiment, the electronic device 300 may include at least one of a display 301, an input device 303, sound output devices 307 and 314, sensor modules 304 and 319, camera modules 305, 312, and 313, key input devices 315 and 317, an indicator (not illustrated), and a connector 308. In some embodiments, the electronic device 300 may omit at least one (e.g., the key input device 317 or the indicator) of the elements, or may additionally include another element.

The display 301 may be visually exposed through, for example, a considerable part of the front plate 302. In some embodiments, at least a part of the display 301 may be exposed through the front plate 302 which forms at least a part of the side surface 310C and the first surface 310A. The display 301 may be coupled to or disposed adjacent to a touch sensing circuit, a pressure sensor capable of measuring the strength (pressure) of touch, or a digitizer for detecting a stylus pen using a magnetic field method. In some embodiments, at least a part of the sensor modules 304 and 319 or at least a part of the key input devices 315 and 317 may be disposed in the first curved surface area and the second curved surface area described above.

The input device 303 may include a microphone 303. In some embodiments, the input device 303 may include a plurality of microphones 303 disposed to sense the direction of sound. The sound output devices 307 and 314 may include speakers 307 and 314. The speakers 307 and 314 may include an external speaker 307 and a call receiver 314. In some embodiments, the microphone 303, the speakers 307 and 314, and the connector 308 may be disposed in the space of the electronic device 300, and may be exposed to an external environment through at least one hole disposed in the housing 310. In some embodiments, the hole disposed in the housing 310 may be commonly used for the microphone 303 and the speakers 307 and 314. In some embodiments, the sound output devices 307 and 314 may include a speaker (e.g., a piezo speaker) operating while the hole disposed in the housing 310 is excluded.

The sensor modules 304 and 319 may generate an electrical signal or a data value, which corresponds to an operation state inside the electronic device 300 or an external environment state. The sensor modules 304 and 319 may include, for example, a first sensor module 304 (e.g., a proximity sensor), a second sensor module (not illustrated) (e.g., a fingerprint sensor), disposed in the first surface 310A of the housing 310, and a third sensor module 319 (e.g., a HRM sensor) disposed in the second surface 310B of the housing 310. The fingerprint sensor may be disposed in the first surface 310A of the housing 310. The fingerprint sensor (e.g., an ultrasonic or optical fingerprint sensor) may be disposed below the display 301, in the first surface 310A. The electronic device 300 may further include at least one of unillustrated sensor modules, for example, a gesture sensor, a gyro sensor, a barometric sensor, a magnetic sensor, an acceleration sensor, a grip sensor, a color sensor, an infrared (IR) sensor, a biometric sensor, a temperature sensor, a humidity sensor, or an illuminance sensor.

The camera modules 305, 312, and 313 may include a first camera device 305 disposed in the first surface 310A of the electronic device 300, and a second camera device 312 and a flash 313 disposed in the second surface 310B of the electronic device 300. The camera modules 305 and 312 may include one or multiple lenses, an image sensor, and an image signal processor. The flash 313 may include, for example, a light-emitting diode or a xenon lamp. In some embodiments, two or more lenses (a wide-angle lens and a telephoto lens) and image sensors may be disposed in one surface of the electronic device 300.

The key input devices 315 and 317 may be disposed in the front surface 310A or the side surface 310C of the housing 310. In another embodiment, the electronic device 300 may not include some or all of the above-described key input devices 315 and 317, and key input devices 315 and 317 may be implemented in another form such as a soft key on the display 301. In another embodiment, the key input devices 315 and 317 may be implemented using a pressure sensor included in the display 301.

The indicator may be disposed in, for example, the first surface 310A of the housing 310. For example, the indicator may provide state information of the electronic device 300 in the form of light. In another embodiment, the light-emitting element may provide, for example, a light source operating in conjunction with an operation of the camera module 305. The indicator may include, for example, an LED, an IR LED, and a xenon lamp.

The connector 308 may accommodate a connector (e.g., a USB connector or an IF module (an interface connector port module)) for transmitting/receiving power and data to/from an external electronic device. In some embodiments, the connector 308 may include another connector hole (or an earphone jack) capable of receiving a connector for transmitting/receiving an audio signal to/from the external electronic device.

The camera module 305 among the camera modules 305 and 312, the sensor module 304 among the sensor modules 304 and 319, or the indicator may be disposed to be exposed through the display 101. For example, the camera module 305, the sensor module 304, or the indicator may be disposed to be exposable to an external environment through an opening formed through the display 301 to the front plate 302 in the internal space of the electronic device 300. In another embodiment, the sensor module 304 may be disposed to perform the function thereof in the inner space of the electronic device without being visually exposed through the front plate 302. For example, in this case, a region of the display 301, facing the camera module 305 or the sensor modules 304, may not require an opening formed therethrough.

Figure 3C:
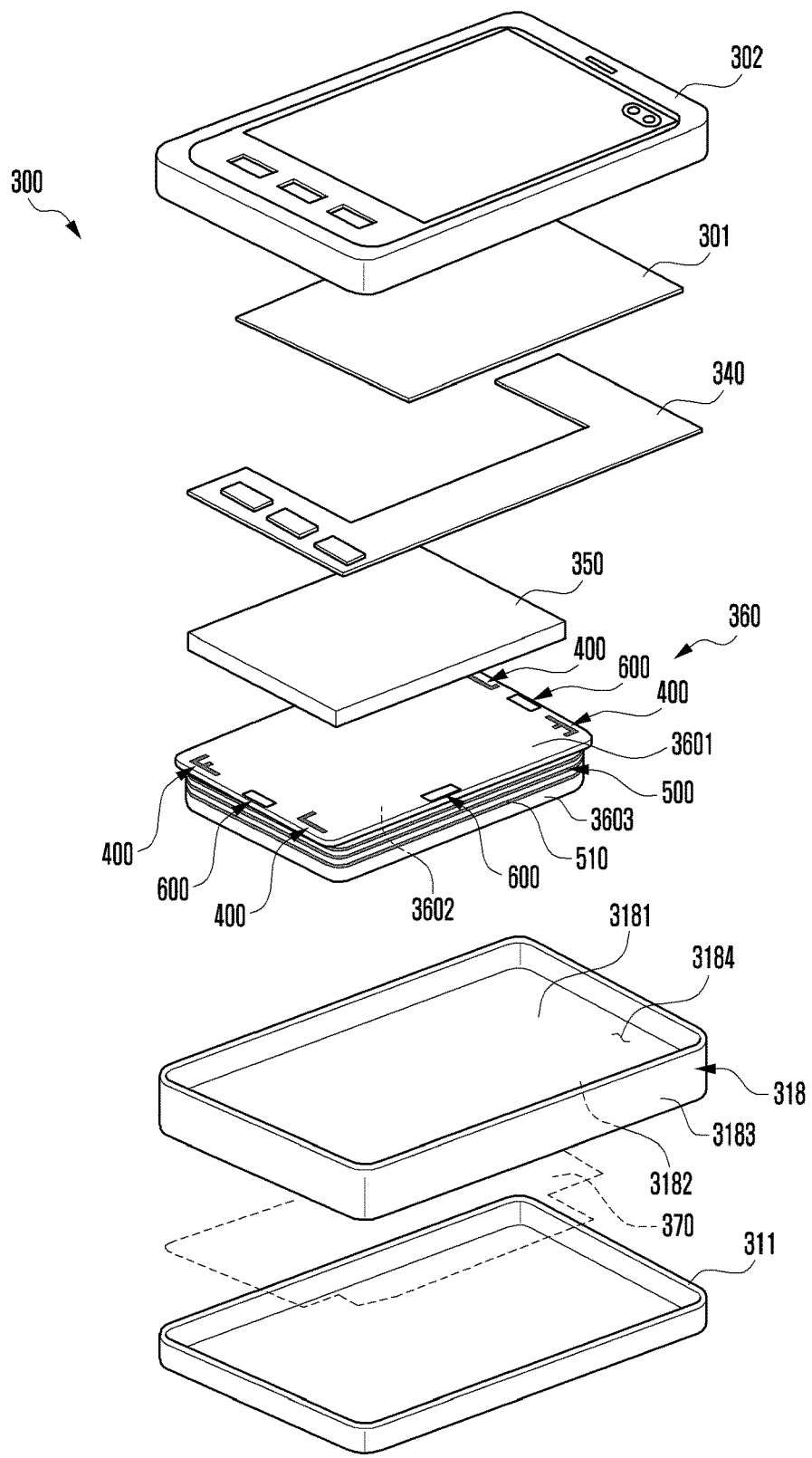
FIG. 3C is an exploded perspective view of an electronic device according to various embodiments of the disclosure.

FIG. 3C is an exploded perspective view of the electronic device 300 according to various embodiments of the disclosure.

Referring to FIG. 3C, the electronic device 300 may include the side frame 318 (e.g., a side member or a side bezel structure) including a support unit (e.g., a bracket), the front plate 302 (e.g., a first cover or a front cover), the display 301, a printed circuit board 340, an antenna carrier 360 including a battery 350, a plurality of antennas 400, 500, and 600, and the rear plate 311 (e.g., a second cover or a rear cover). In some embodiments, the electronic device 300 may omit at least one of the elements, or may additionally include another element. At least one of the elements of the electronic device 300 may be the same as or similar to at least one of the elements of the electronic device 300 in FIG. 3A or FIG. 3B, and a redundant description thereof will be omitted below.

According to various embodiments, the side frame 318 may include a first frame surface 3181 facing the front plate 302, a second frame surface 3182 facing a direction opposite to the first frame surface 3181, and a side frame surface 3183 surrounding the edges of the first frame surface 3181 and the second frame surface 3182 and forming at least a part of the exterior of a side surface of the electronic device 300. According to an embodiment, the support unit may be disposed inside the electronic device to be connected to the side frame 318 or may be integrally formed with the side frame 318. The support unit may be made of, for example, a metal material or a non-metal material (e.g., a polymer). The support unit may be coupled to the display 301 at one surface thereof and may be coupled to the printed circuit board 340 at the other surface thereof. On the printed circuit board 340, a processor, a memory, or an interface may be mounted. The processor may include one or more of, for example, a central processing unit, an application processor, a graphics processor, an image signal processor, a sensor hub processor, or a communication processor.

The memory may include, for example, a volatile memory or a nonvolatile memory.

The interface may include, for example, a high definition multimedia interface (HDMI), a universal serial bus (USB) interface, an SD card interface, or an audio interface. The interface may electrically or physically connect, for example, the electronic device 300 to an external electronic device, and may include a USB connector, an SD card/an MMC connector, or an audio connector.

The battery 350 is a device for supplying power to at least one element of the electronic device 300, and may include, for example, a non-rechargeable primary battery, a rechargeable secondary battery, or a fuel cell. At least a portion of the battery 350 may be disposed on substantially the same plane as, for example, the printed circuit board 340. The battery 350 may be integrally disposed inside the electronic device 300, or may be detachably disposed on the electronic device 300.

According to various embodiments, the electronic device 300 may include an antenna carrier 360 (e.g., a dielectric structure or an antenna structure). The antenna carrier 360 may be disposed between the rear plate 311 and the battery 350. The antenna carrier 360 may include, for example, a near field communication (NFC) antenna, a wireless charging antenna, or a magnetic secure transmission (MST) antenna. The antenna carrier 360 may perform short-range communication with, for example, an external electronic device, or may transmit/receive power required for charging to/from the external device in a wireless manner. In another embodiment, an antenna structure may be constituted with a part of the side frame 318, the support unit, or a combination thereof.

Although not illustrated, when the electronic device 300 includes an electronic pen (e.g., a stylus pen) as an input means, the electronic device 300 may further include a detection member (e.g., a digitizer) configured to detect the electronic pen.

According to various embodiments, the antenna carrier 360 may include a plurality of antennas 400, 500, and 600 configured to operate in different frequency bands. According to an embodiment, the antenna carrier 360 may include a first surface 3601 facing the front plate 302, a second surface 3602 facing a direction opposite to the first surface 3601, and a side surface 3603 surrounding a space between the first surface 3601 and the second surface 3602. In some embodiments, the antenna carrier 360 may include an accommodating unit capable of accommodating at least a portion of the printed circuit board 340 or the battery 350.

According to exemplary embodiments of the disclosure, the plurality of antennas 400, 500, and 600 operating in different service bands (e.g., a legacy band, a high frequency (HF) band, or a mmWave band) may be disposed in one electronic device 300 so that the convenience of use of the electronic device 300 is improved.

Figure 4A:
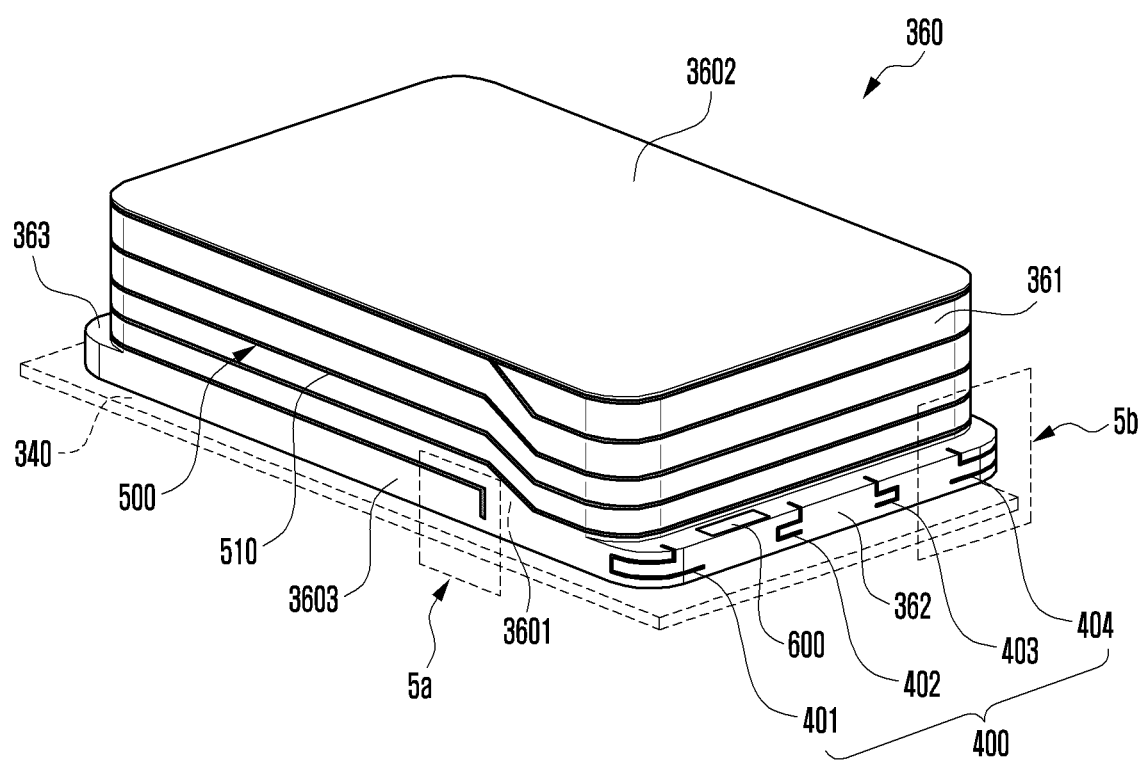
FIG. 4A and FIG. 4B are a perspective view and a plan view of an antenna carrier including a plurality of antennas according to various embodiments of the disclosure.
Figure 4B:
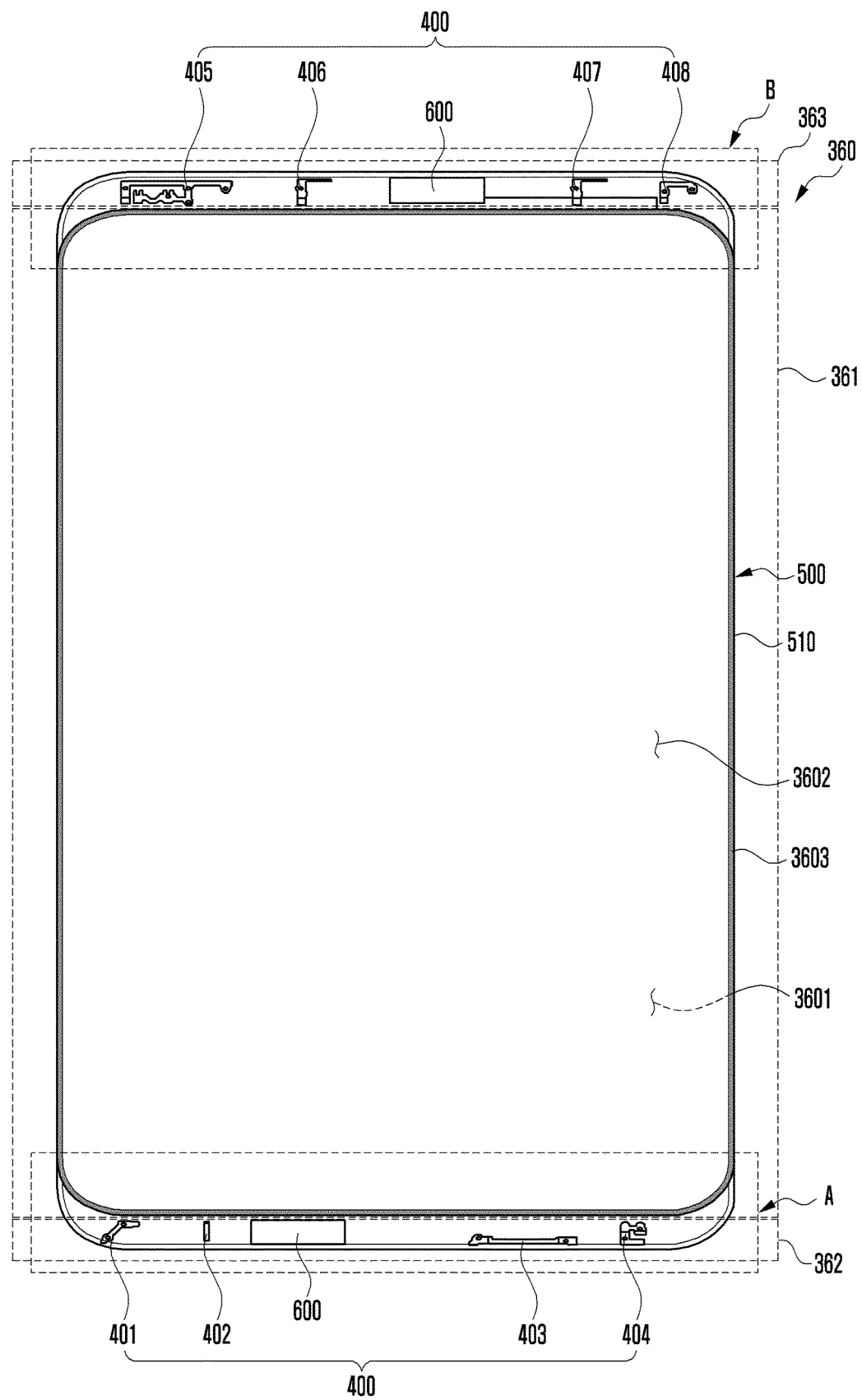

FIG. 4A and FIG. 4B are a perspective view and a plan view of the antenna carrier 360 including the plurality of antennas 400, 500, and 600 according to various embodiments of the disclosure.

Referring to FIG. 4A and FIG. 4B, the antenna carrier 360 may include a body 361 having a first surface 3601, a second surface 3602 facing a direction opposite to the first surface 3601, and a side surface 3603 surrounding a space between the first surface 3601 and the second surface 3602. According to an embodiment, the antenna carrier 360 may be made of an injection molded material of a polymer material.

According to various embodiments, the antenna carrier 360 may include the plurality of antennas 400, 500, and 600. For example, a first antenna 400 may include a (1-1)th antenna 401, a (1-2)th antenna 402, a (1-3)th antenna 403, a (1-4)th antenna 404, a (1-5)th antenna 405, a (1-6)th antenna 406, a (1-7)th antenna 407, and a (1-8)th antenna 408. According to an embodiment, the plurality of antennas 400, 500, and 600 may include a laser direct structuring (LDS) pattern positioned on at least one of the first surface 3601, the second surface 3602, or the side surface 3603 of the antenna carrier 360. According to an embodiment, the plurality of antennas 400, 500, and 600 may include a conductive plate attached to the antenna carrier 360, a flexible printed circuit board (FPCB) including a pattern structure, or a conductive paint applied to an outer surface of the antenna carrier 360. According to an embodiment, the plurality of antennas 400, 500, and 600 may include at least one first antenna 400 operating in a first frequency band (e.g., 400 MHz-3000 MHz) (e.g., microwave), the second antenna 500 operating in a second frequency band (e.g., 3 MHz-30 MHz) (e.g., short-wave), or at least one third antenna 600 operating in a third frequency band (e.g., 3 MHz-100 GHz) (e.g., millimeter wave). According to an embodiment, the at least one third antenna 600 operating in the third frequency band and the at least one first antenna 400 operating in the first frequency band may be arranged in at least partial area of the first surface 3601, the second surface 3602, or the side surface 3603 of the antenna carrier 360. According to an embodiment, since the second antenna 500 operating in the second frequency band may include a radiator having a relatively long electrical length, the second antenna 500 may be arranged such that it is wound multiple times along the side surface 3603 of the antenna carrier 360 to have an interval by which they are spaced apart from each other. For example, the second antenna 500 may include a conductive pattern 510 disposed to be wound around the outer surface of the antenna carrier 360. In another embodiment, the second antenna 500 may be arranged such that the conductive pattern 510 is wound multiple times along the inner surface of the side frame 318 instead of the antenna carrier 360. The side frame 318 may include, for example, a conductive material.

According to various embodiments, the antenna carrier 360 may include a first flange 362 and a second flange 363 extending from the side surface 3603 of the body 361. According to an embodiment, the first flange 362 may extend in a downward direction (e.g., a −y-axis direction in FIGS. 3A and 3B) of the electronic device 300 from the side surface 3603 of the antenna carrier 360. The second flange 363 may be disposed in a direction opposite to the first flange 362 and may extend in an upward direction (e.g., a y-axis direction in FIGS. 3 and 3B) of the electronic device 300. Therefore, the first flange 362 or the second flange 363 may provide an arrangement space in which the at least one first antenna 400 or the at least one third antenna 600 are arranged. In another embodiment, the first flange 362 and the second flange 363 may be configured to be connected to each other. For example, the first flange 362 and the second flange 363 may be changed to various positions in which the efficient radiation of the antennas 400 and 600 arranged in the electronic device 300 is exhibited and the structural coupling or connection with surrounding electronic components (e.g., the printed circuit board 340) is easy. In another embodiment, the first antenna 400 and the third antenna 600 may be directly arranged in at least a partial area of the first surface 3601, the second surface 3602, or the side surface 3603 of the antenna carrier 360 without the first flange and/or the second flange.

In some embodiments, the at least one first antenna 400 may be made of a conductive material and replaced by a portion of the side frame 318 made of a unit conductive portion by at least one non-conductive portion.

Figure 5A:
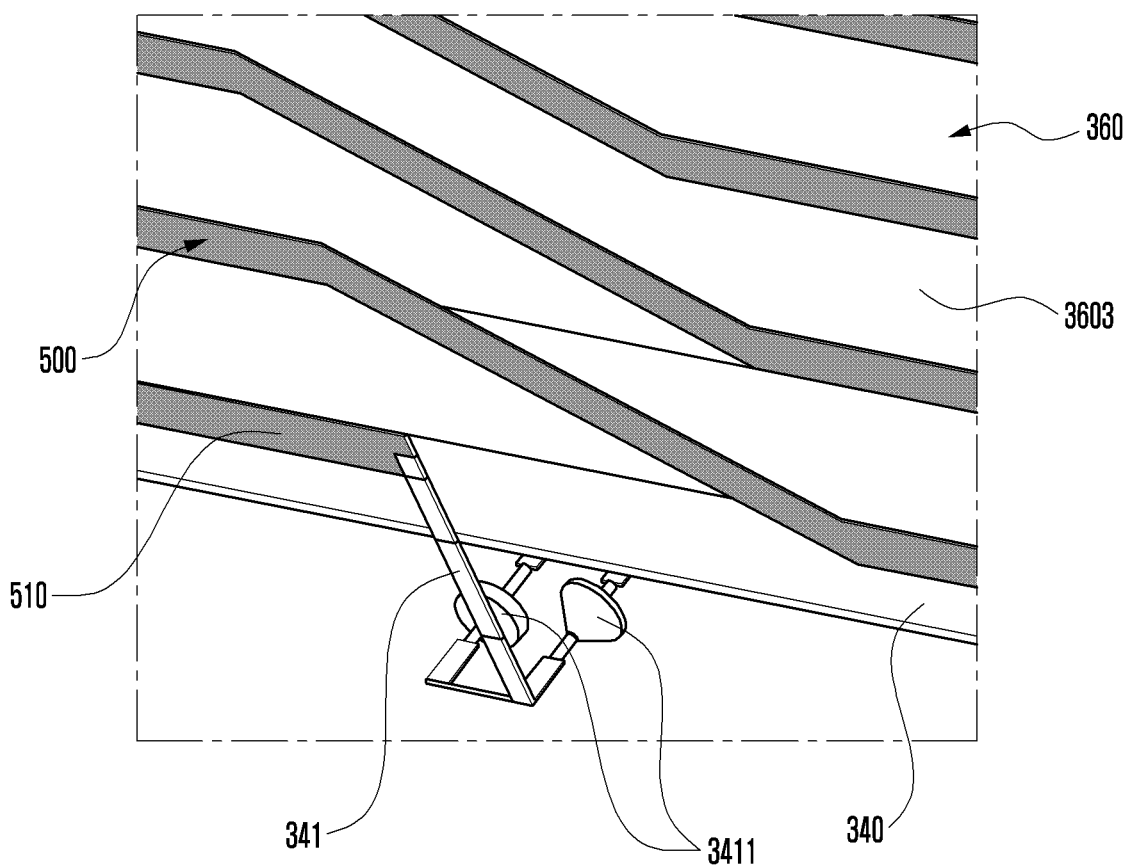
FIG. 5A is a partial perspective and enlarged view of a region 5a of FIG. 4A according to various embodiments of the disclosure.

FIG. 5A is a partial perspective and enlarged view of a region 5a of FIG. 4A according to various embodiments of the disclosure.

Referring to FIG. 5A, the second antenna 500 may include the conductive pattern 510 arranged to be wound multiple times on the side surface 3603 of the antenna carrier 360. According to an embodiment, one end of the conductive pattern 510 may be electrically and physically connected to the printed circuit board 340. For example, the conductive pattern 510 may be electrically connected to a wireless communication circuit (e.g., an HF module) (e.g., the wireless communication module 192 in FIG. 1) arranged on the printed circuit board 340. According to an embodiment, when one end of the conductive pattern 510 and the printed circuit board 340 are arranged to be spaced apart from each other, it may be electrically connected to the printed circuit board 340 via a conductive extension part 341. According to an embodiment, the conductive extension part 341 may be electrically connected to the printed circuit board 340 via electrical connection members 3411. According to an embodiment, one of the electrical connection members 3411 may be electrically connected to a wireless communication circuit (e.g., a feeding unit) (e.g., the wireless communication module 192 in FIG. 1) of the printed circuit board 340. Therefore, the wireless communication circuit (e.g., the wireless communication module 192 in FIG. 1) may be configured to transmit and receive a wireless signal via the conductive pattern. According to an embodiment, it may further include at least one matching circuit disposed between the wireless communication circuit (e.g., the wireless communication module 192 in FIG. 1) and one of the electrical connection members 3411. According to an embodiment, the other one of the electrical connection members 3411 may be electrically connected to the grounded portion of the printed circuit board 340. According to an embodiment, the electrical connection members 3411 may include a C-clip, a conductive tape, or a conductive bonding material.

Figure 5B:
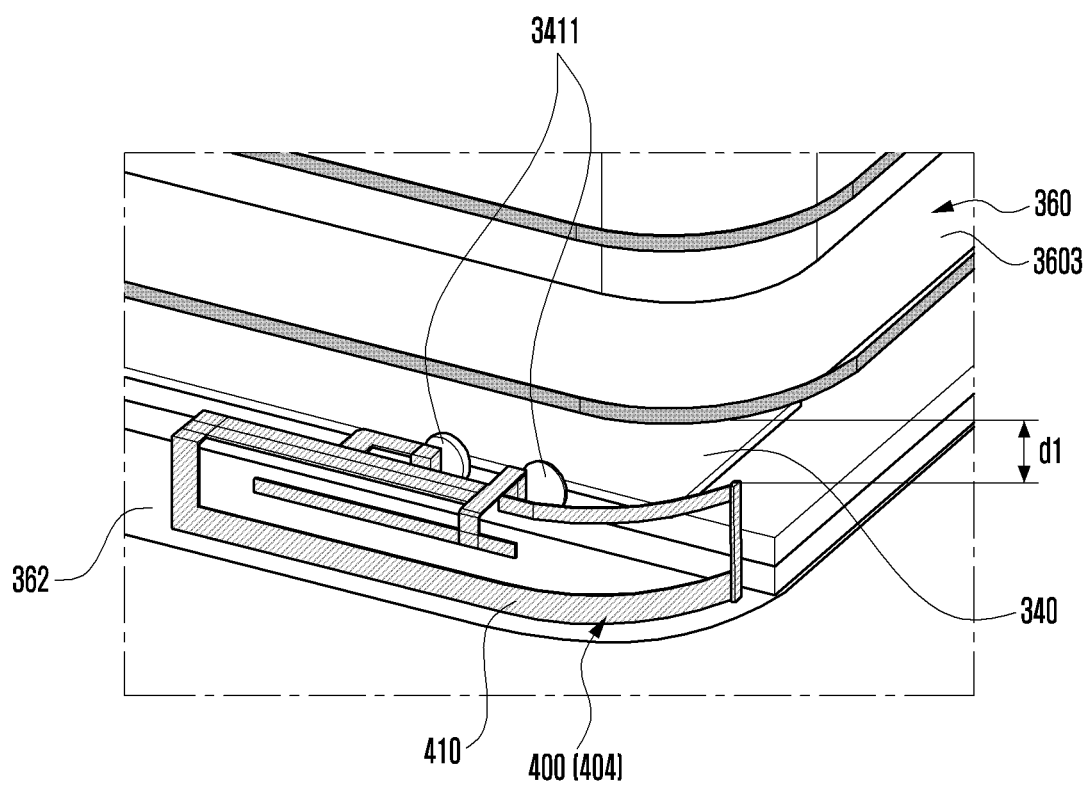
FIG. 5B is a partial perspective and enlarged view of a region 5b of FIG. 4A according to various embodiments of the disclosure.

FIG. 5B is a partial perspective and enlarged view of a region 5b of FIG. 4A according to various embodiments of the disclosure.

Referring to FIG. 5B, the (1-4)th antenna 404 of the first antenna 400 may include an antenna pattern 410 made of a conductive material arranged on the first flange 362 of the antenna carrier 360. According to an embodiment, the antenna pattern 410 may be disposed in at least a partial area of the first flange 362. According to an embodiment, at least a portion of the antenna pattern 410 may be disposed to be exposed in a direction toward the printed circuit board 340 from the first flange 362, and the exposed portion of the antenna pattern 410 may be electrically connected to the printed circuit board 340. According to an embodiment, the antenna pattern 410 may be electrically connected to the ground or the wireless communication circuit (e.g., the wireless communication module 192 in FIG. 1) arranged on the printed circuit board 340 via the electrical connection member 3411. For example, one of the electrical connection members 3411 may be electrically connected to the wireless communication circuit (e.g., the feeding unit) (e.g., the wireless communication module 192 in FIG. 1) of the printed circuit board 340. Therefore, the wireless communication circuit (e.g., the wireless communication module 192 in FIG. 1) may be configured to transmit or receive a wireless signal via the antenna pattern 410. According to an embodiment, it may further include at least one matching circuit disposed between the wireless communication circuit (e.g., the wireless communication module 192 in FIG. 1) and one of the electrical connection members 3411. According to an embodiment, the other one of the electrical connection members 3411 may be electrically connected to the grounded portion of the printed circuit board 340. According to an embodiment, an assembly structure in which the antenna carrier 360 and the printed circuit board 340 are assembled in the electronic device 300 may allow the exposed portion of the antenna pattern 410 to be electrically connected to the printed circuit board 340. In another embodiment, the antenna pattern 410 may be electrically connected to the printed circuit board 340 via an electrical connection member such as a C-clip, a conductive tape or a conductive bonding material. According to an embodiment, the other antennas 401, 402, 403, 405, 406, 407, and 408 of the first antenna 400 may also be formed in substantially the same way.

According to various embodiments, the first antenna 400 may be disposed to be spaced by a designated separation distance d1 apart from the second antenna 500. For example, the first antenna 400 may be prevented from deteriorating the radiation performance by arranging the antenna pattern 410 to have a distance equal to or larger than the designated separation distance from the conductive pattern 510 of the second antenna 500. According to an embodiment, the antenna pattern 410 may be arranged such that the separation distance d1 by which the antenna pattern is perpendicularly spaced apart from the conductive pattern 510 is at least 2.5 mm.

In an exemplary embodiment of the disclosure, only one of the antenna patterns 410 arranged on the first flange 362 has been illustrated and described, but is not limited thereto. For example, another antenna pattern which is arranged on the other portion of the first flange 362 or arranged on the second flange 363 may also be electrically connected to the printed circuit board 340 in substantially the same manner.

Figure 6A:
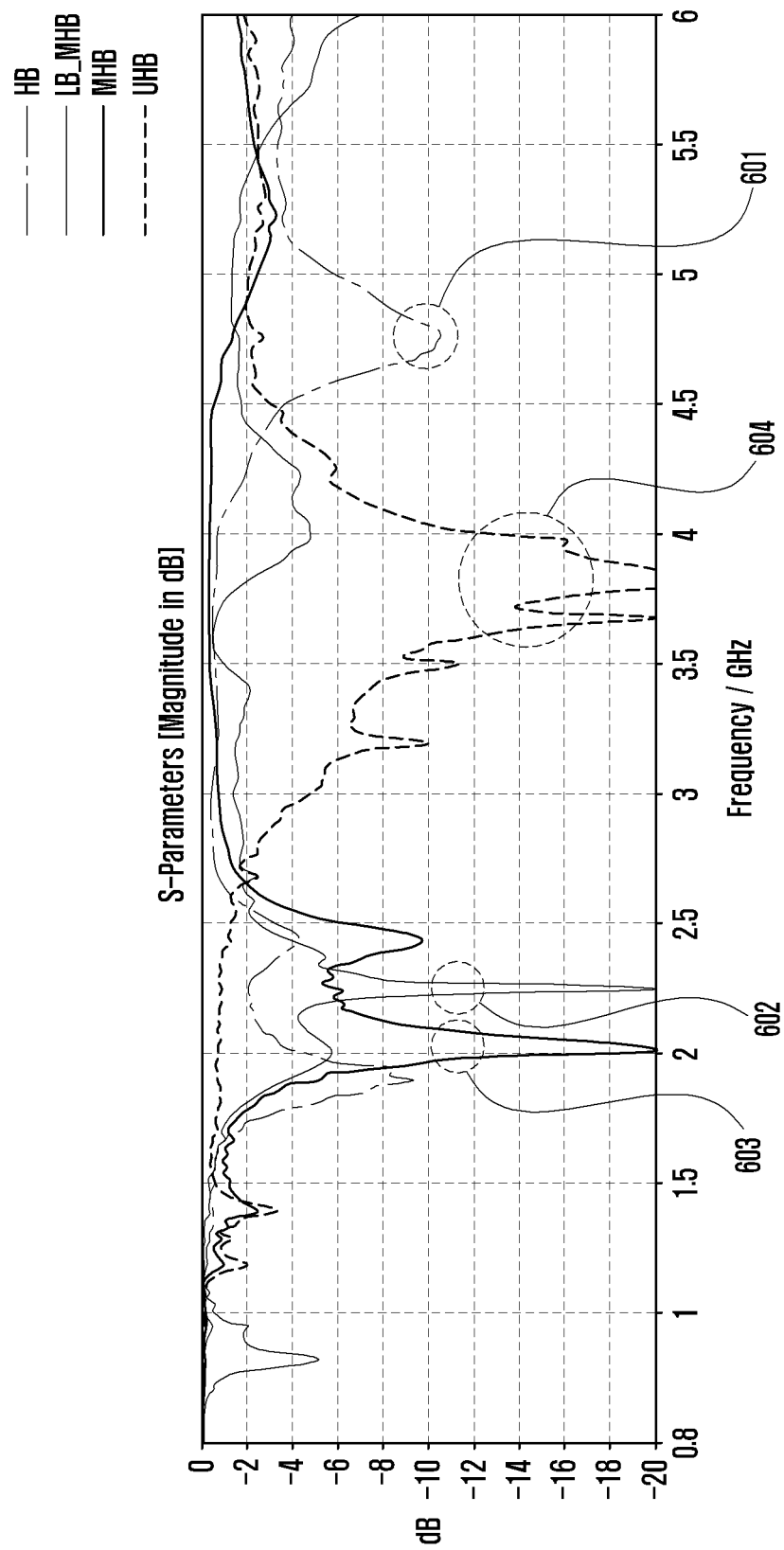
FIG. 6A is a graph showing radiation performance of at least one first antenna disposed in region A of FIG. 4B according to various embodiments of the disclosure.

FIG. 6A is a graph showing radiation performance of the at least one first antenna 400 disposed in a region A of FIG. 4B according to various embodiments of the disclosure.

FIG. 6A is a graph showing S11 of the at least one first antenna 400 arranged in the first flange 362, and it can be seen that the first antenna 400 exhibits smooth radiation performance in a high band (HB) (area 601), a low band_mid high band (LB_MHB) (area 602), a mid high band (MHB) (area 603), or a ultra high band (UHB) (area 604). It may mean that, even when the first antenna 400 is disposed adjacent to the second antenna 500 in the antenna carrier 360, the radiation performance equal to or higher than the existing level is exhibited without the interference of the second antenna.

Figure 6B:
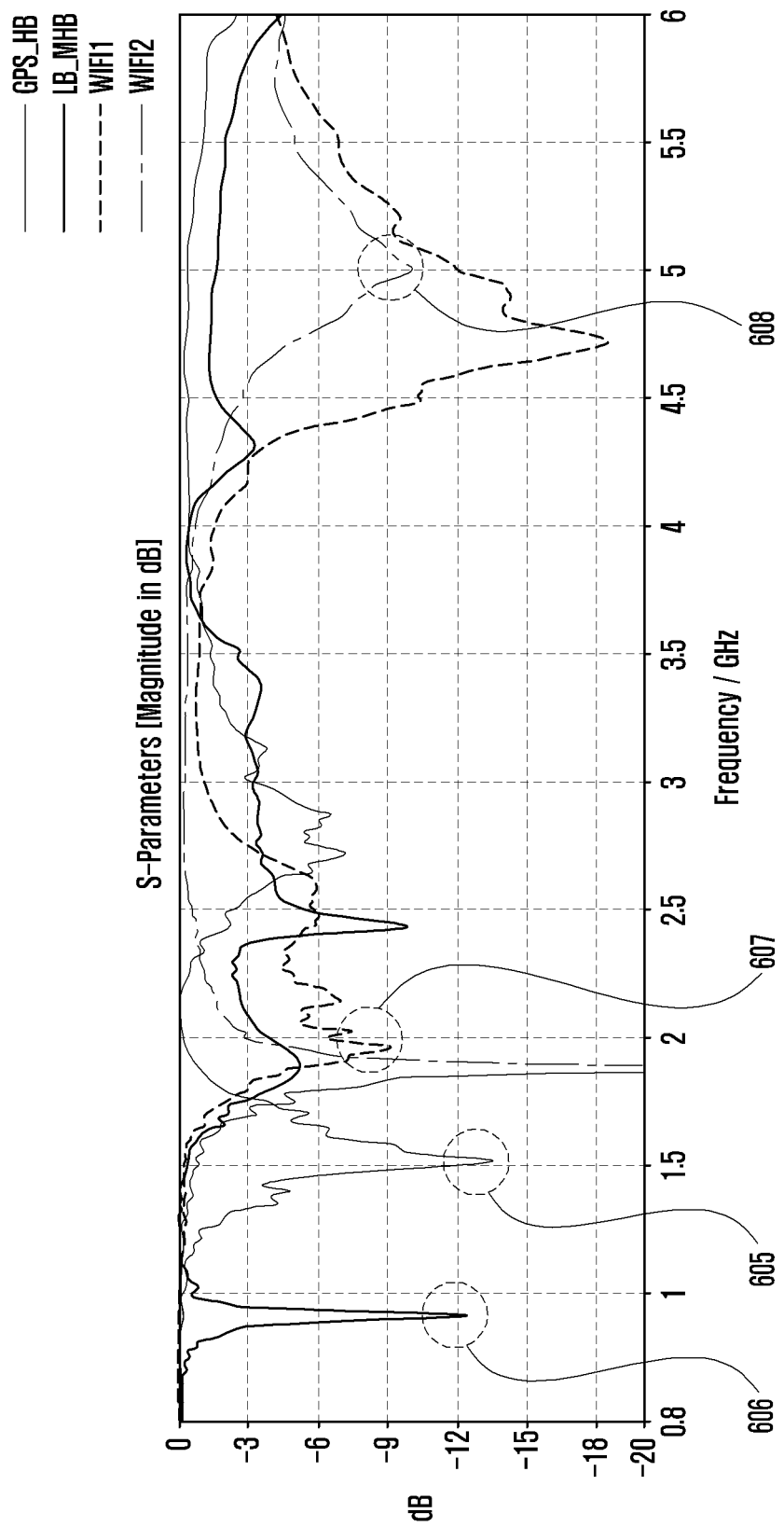
FIG. 6B is a graph showing radiation performance of at least one first antenna disposed in region B of FIG. 4B according to various embodiments of the disclosure.

FIG. 6B is a graph showing radiation performance of the at least one first antenna 400 disposed in a region B of FIG. 4B according to various embodiments of the disclosure.

FIG. 6B is a graph showing S11 of at least one first antenna 400 arranged in the second flange 363, and it can be seen that the first antenna 400 exhibits smooth radiation performance in a GPS_HB band (area 605), a LB_MHB band (area 606), a WIFI 1 band (area 607), or a WIFI 2 band (area 608). It may mean that, even when the first antenna 400 is disposed adjacent to the second antenna 500 in the antenna carrier 360, the radiation performance equal to or higher than the existing level is exhibited without the interference of the second antenna.

Figure 7A:
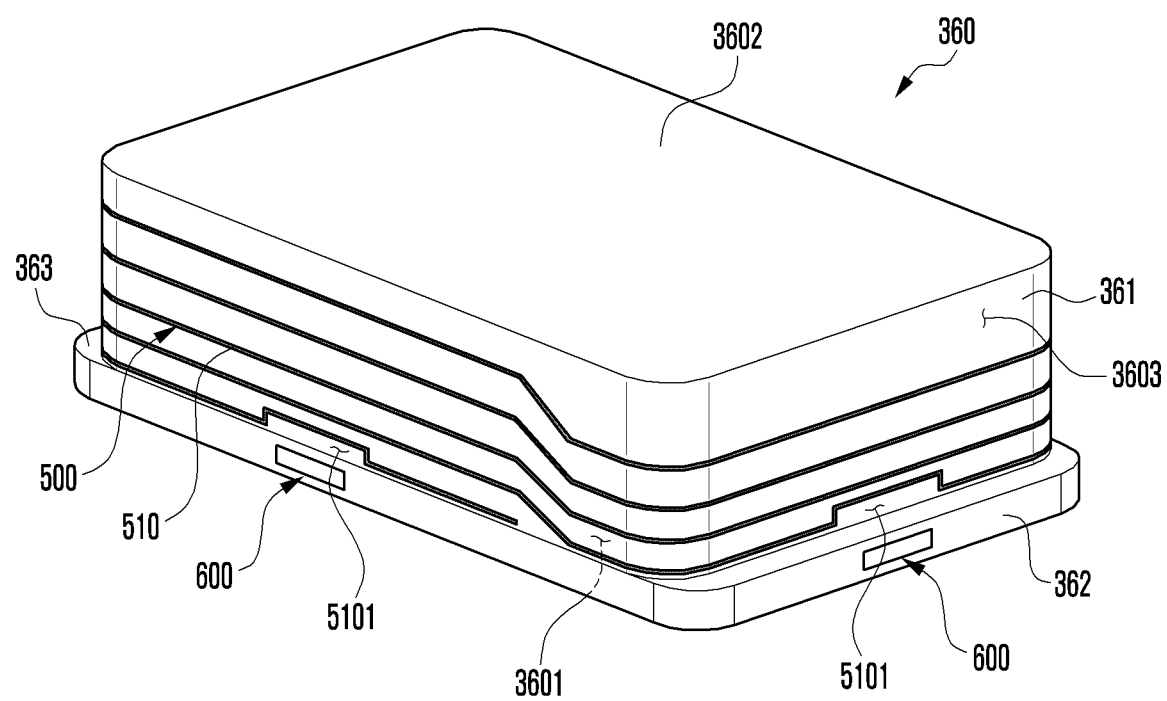
FIG. 7A and FIG. 7B are front and rear perspective views of an antenna carrier, illustrating a state in which at least one third antenna is disposed in an antenna carrier according to various embodiments of the disclosure.
Figure 7B:
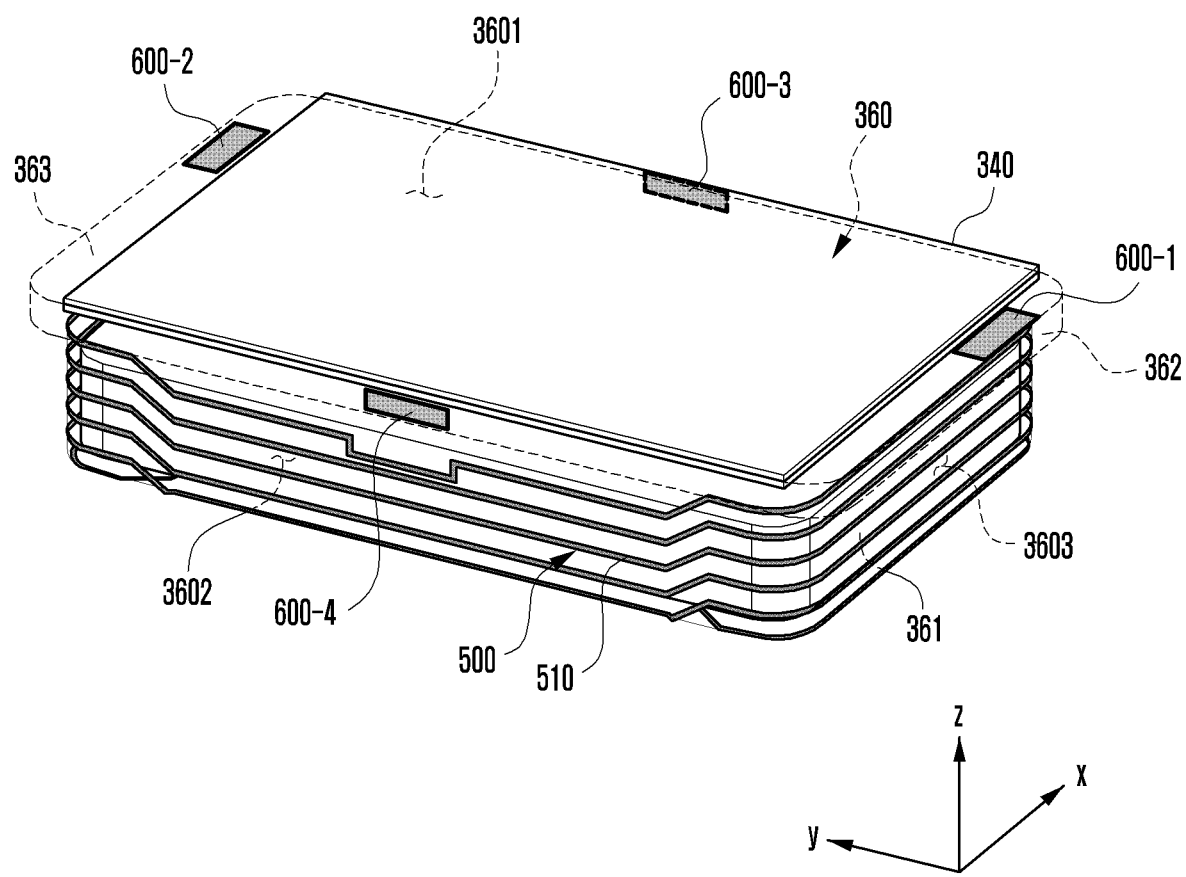

FIG. 7A and FIG. 7B are front and rear perspective views of the antenna carrier 360, illustrating a state in which the at least one third antenna 600 is disposed in the antenna carrier 360 according to various embodiments of the disclosure.

Referring to FIG. 7A, the antenna carrier 360 may include the at least one third antenna 600 disposed adjacent to the second antenna 500. According to an embodiment, the at least one third antenna 600 may include a mmWave antenna structure. According to an embodiment, the third antenna 600 may include a substrate and a plurality of antenna elements arranged to be spaced apart from each other with respect to the substrate. According to an embodiment, the plurality of antenna elements may be configured to have a phase such that a beam pattern is formed in a specific direction. Although not illustrated, the third antenna 600 may be electrically connected to a wireless communication circuit (e.g., the wireless communication module 192 in FIG. 1) arranged in the internal space of the electronic device. According to an embodiment, the third antenna 600 may include a patch antenna including a conductive patch arranged on a substrate or a dipole antenna including a conductive pattern as a plurality of antenna elements.

According to various embodiments, the second antenna 500 may include a portion 5101 (e.g., an avoidance region) spaced apart by a specified distance from the third antenna 600 in order to prevent performance degradation of the third antenna 600. According to an embodiment, the spaced portion 5101 may include a region in which the conductive pattern 510 is partially changed to be away from the periphery of the third antenna 600. For example, in the spaced portion 5101, a portion of the conductive pattern 510 of the second antenna 500 is formed in a quadrangular shape from the third antenna 600 so that the vertical distance between two antennas 500 and 600 is formed farther than that in the periphery, but is not limited thereto. For example, the spaced portion 5101 may be formed through a portion of the conductive pattern 510 in various shapes such as a curved shape or a polygon so as to have a designated distance, e.g., a distance, from the third antenna 600.

Referring to FIG. 7B, the at least one third antenna 600 may include a first sub antenna 600-1 and a second sub antenna 600-2 arranged on the first flange 362 of the antenna carrier 360 and a third sub antenna 600-3 and a fourth sub antenna 600-4 arranged on the second flange 363 of the antenna carrier 360. According to an embodiment, the plurality of sub antennas 600-1, 600-2, 600-3, and 600-4 may be arranged on at least one of the first surface 3601, the second surface 3602, or the side surface 3603 of the antenna carrier 360 according to the designated beam pattern direction. For example, the first sub antenna 600-1 or the second sub antenna 600-2 may be arranged such that a beam pattern is formed in a z-axis direction from the first flange 362 and the second flange 363. For example, the first sub antenna 600-1 or the second sub antenna 600-2 may be configured such that a beam pattern is formed in a direction in which a front surface (e.g., the front surface 310A in FIG. 3A) or a rear surface (e.g., the rear surface 310B in FIG. 3B) of an electronic device (e.g., the electronic device 300 in FIG. 3A) face. According to an embodiment, the third sub antenna 600-3 or the fourth sub antenna 600-4 may be arranged such that a beam pattern is formed in an x-axis direction from the side surface 3603 of the antenna carrier 360. For example, the third sub antenna 600-3 and the fourth sub antenna 600-4 may be configured such that a beam pattern is formed in a direction in which the side surface (e.g., the side surface 310C in FIG. 3A) of the electronic device (e.g., the electronic device 300 in FIG. 3A) faces.

Figure 8:
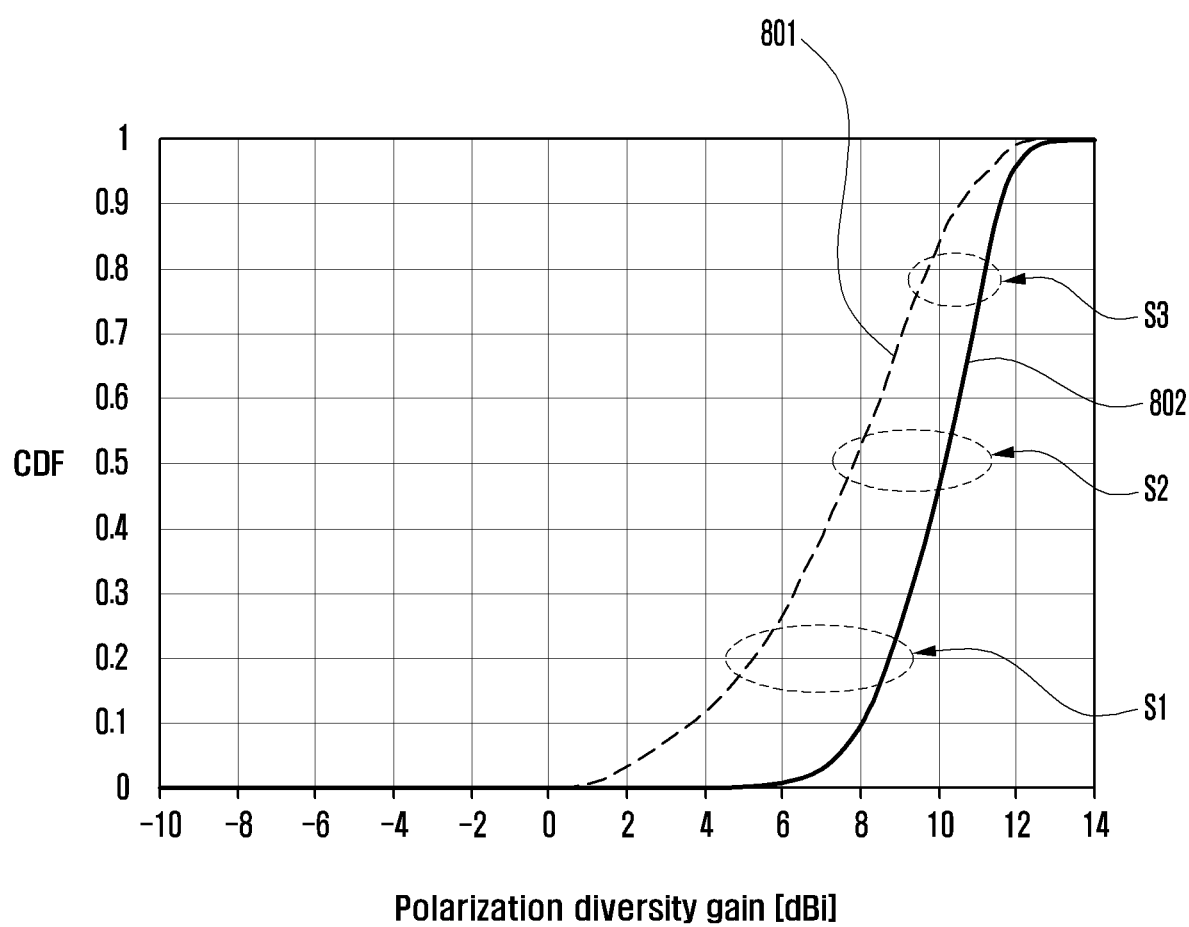
FIG. 8 is a graph showing a cumulative distribution function (CDF) of a third antenna, depending on the presence and absence of a second antenna, according to various embodiments of the disclosure.

FIG. 8 is a graph showing a cumulative distribution function (CDF) of the third antenna 600, depending on the presence and absence of the second antenna 500, according to various embodiments of the disclosure.

Referring to FIG. 8, it can be seen that the gain of the third antenna 600 is improved when the second antenna is present (graph 802) than when the second antenna 500 is not present (graph 801) in the CDF 0.2 section (section S1), the CDF 0.5 section (section S2), and CDF 0.8 section (section S3). It may mean that the conductive pattern 510 of the second antenna 500 disposed around the third antenna 600 can operate as a reflector so as to help the third antenna 600 form a beam pattern in the desired direction and prevent the radiation performance degradation.

Figure 9A:
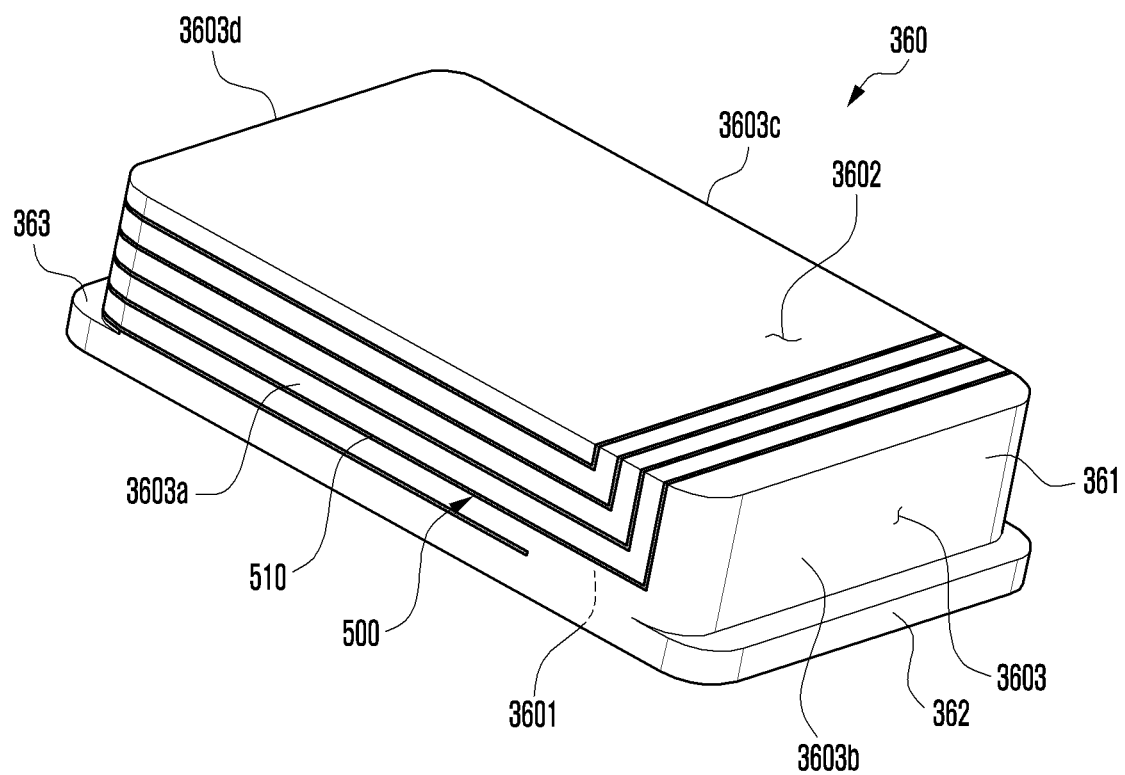
FIG. 9A and FIG. 9B are views illustrating various arrangement configurations of a conductive pattern of a second antenna according to various embodiments of the disclosure.
Figure 9B:
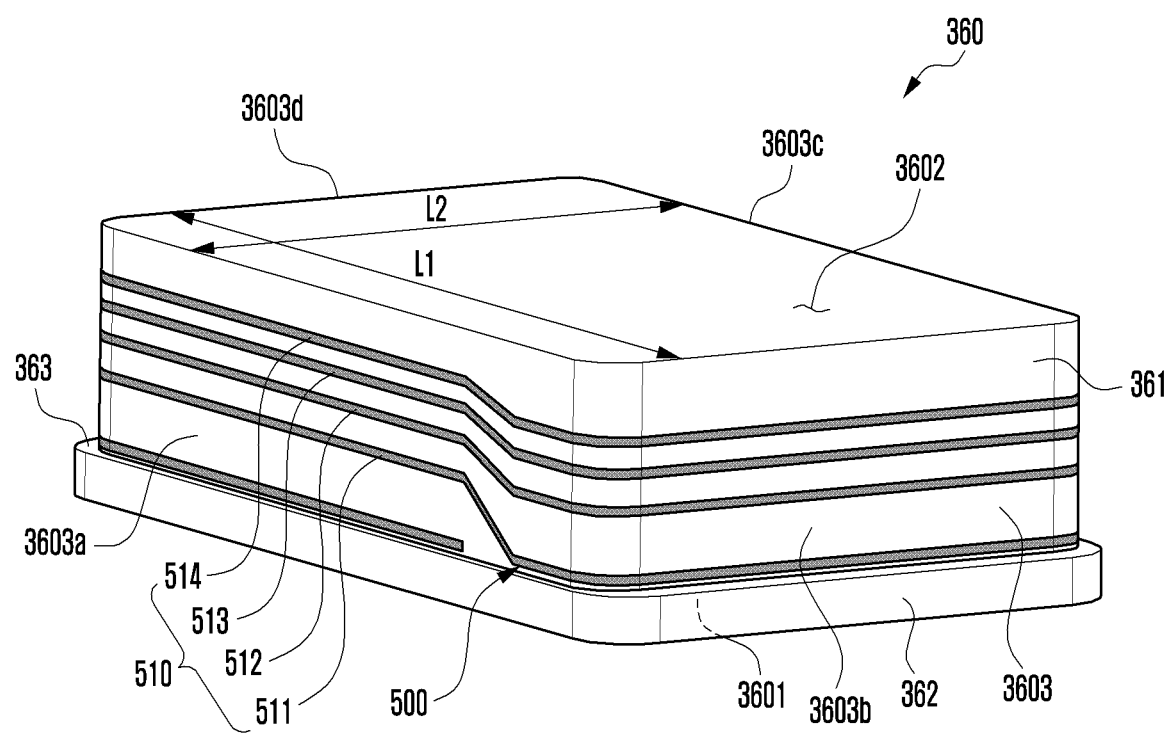

FIG. 9A and FIG. 9B are views illustrating various arrangement configurations of the conductive pattern 510 of the second antenna 500 according to various embodiments of the disclosure.

Referring to FIG. 9A, the conductive pattern 510 of the second antenna 500 may be arranged to be wound multiple times via at least a part of the side surface 3603 and the second surface 3602 of the antenna carrier 360. For example, the conductive pattern 510 may determine the number of windings (electrical length) and the arrangement position in order to improve the self-radiation performance of the second antenna 500 in consideration of the arrangement relationship with the peripheral antenna (e.g., the first antenna 400 and the third antenna 600). According to an embodiment, since the conductive pattern 510 may include the conductive pattern 510 having a relatively long electrical length depending on the frequency characteristics (e.g., short wave (HF)) of the second antenna 500, even with the same number of windings, the arrangement position may be partially changed so as to have a longer electrical length.

Referring to FIG. 9B, the side surface 3603 of the antenna carrier 360 may be formed in a rectangular shape. According to an embodiment, the side surface 3603 of the antenna carrier 360 may include a first side surface 3603a having a first length L1, a second side surface 3603b extending in a vertical direction from the first side surface 3603a and having a second length L2 shorter than the first length L1, a third side surface 3603c extending parallelly to the first side surface 3603a from the second side surface 3603b and having the first length L1, and a fourth side surface 3603d extending parallelly to the second side surface 3603b from the third side surface 3603c and having the second length L2.

According to various embodiments, the conductive pattern 510 of the second antenna 500 may include wound portions 511, 512, 513, and 514 which are wound multiple times to have a designated distance via the side surface 3603 of the antenna carrier 360. According to an embodiment, the wound portions may include, for example, a first wound portion 511, a second wound portion 512, a third wound portion 513, and a fourth wound portion 514 which are sequentially spaced apart from one another. In another embodiment, the wound portions may be wound around the antenna carrier 360 to have four or more lines. According to an embodiment, the first wound portion 511, the second wound portion 512, the third wound portion 513, and the fourth wound portion 514 may be arranged to have different winding positions in at least a portion of the first side surface 3603a, the second side surface 3603b, the third side surface 3603c, or the fourth side surface 3603d. For example, at least one of the first wound portion 511, the second wound portion 512, the third wound portion 513, and the fourth wound portion 514 may be disposed to have different vertical distances with respect to the second surface 3602 on the first side surface 3603a and the fourth side surface 3603d. According to an embodiment, the first wound portion 511, the second wound portion 512, the third wound portion 513, and the fourth wound portion 514 may be arranged to have different line intervals in at least a portion of the first side surface 3603a, the second side surface 3603b, the third side surface 3603c, or the fourth side surface 3603d. For example, the conductive pattern 510 is arranged such that the distance between the first wound portion 511 and the second wound portion 512 is larger than the distance between the third wound portion 513 and the fourth wound portion 514 on the first side surface 3603a, but may be arranged such that the distances between the first wound portion 511, the second wound portion 512, the third wound portion 513, and the fourth wound portion 514 are substantially identical on the fourth side surface 3603d. According to an embodiment, the first wound portion 511, the second wound portion 512, the third wound portion 513, and the fourth wound portion 514 of the conductive pattern 510 of the second antenna 500 disposed in the antenna carrier 360 may be at least partially changed and arranged in various ways in consideration of interference with peripheral antennas (e.g., the first antenna 400 or the third antenna 600) or the arrangement structure with peripheral electronic components.

Figure 10A:
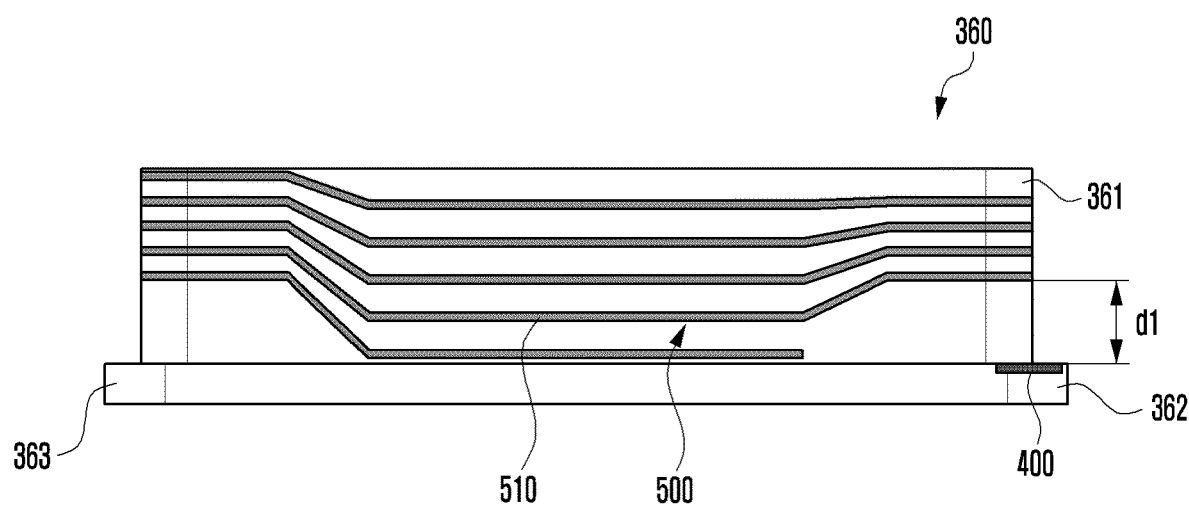
FIG. 10A is a side view of an antenna carrier, illustrating a distance of spacing between a first antenna and a second antenna according to various embodiments of the disclosure.

FIG. 10A is a side view of the antenna carrier 360, illustrating a distance d1 between the first antenna and the second antenna according to various embodiments of the disclosure.

Referring to FIG. 10A, the antenna carrier 360 may include the first antenna 400 disposed via the first flange 362. According to an embodiment, the antenna carrier 360 may include the second antenna 500 having the conductive pattern 510 wound multiple times via the body 361. According to an embodiment, the first antenna 400 may be disposed to have a designated separation distance d1 from the second antenna 500. For example, the first antenna 400 may be disposed to have the designated separation distance d1 or more from the conductive pattern 510 of the second antenna 500 so as to prevent the radiation performance of the first antenna 400 or the second antenna 500 from deteriorating. According to an embodiment, the first antenna 400 may be arranged to have at least 2.5 mm of the separation distance d1 by which the first antenna 400 is vertically spaced apart from the conductive pattern 510 of the second antenna 500.

Figure 10B:
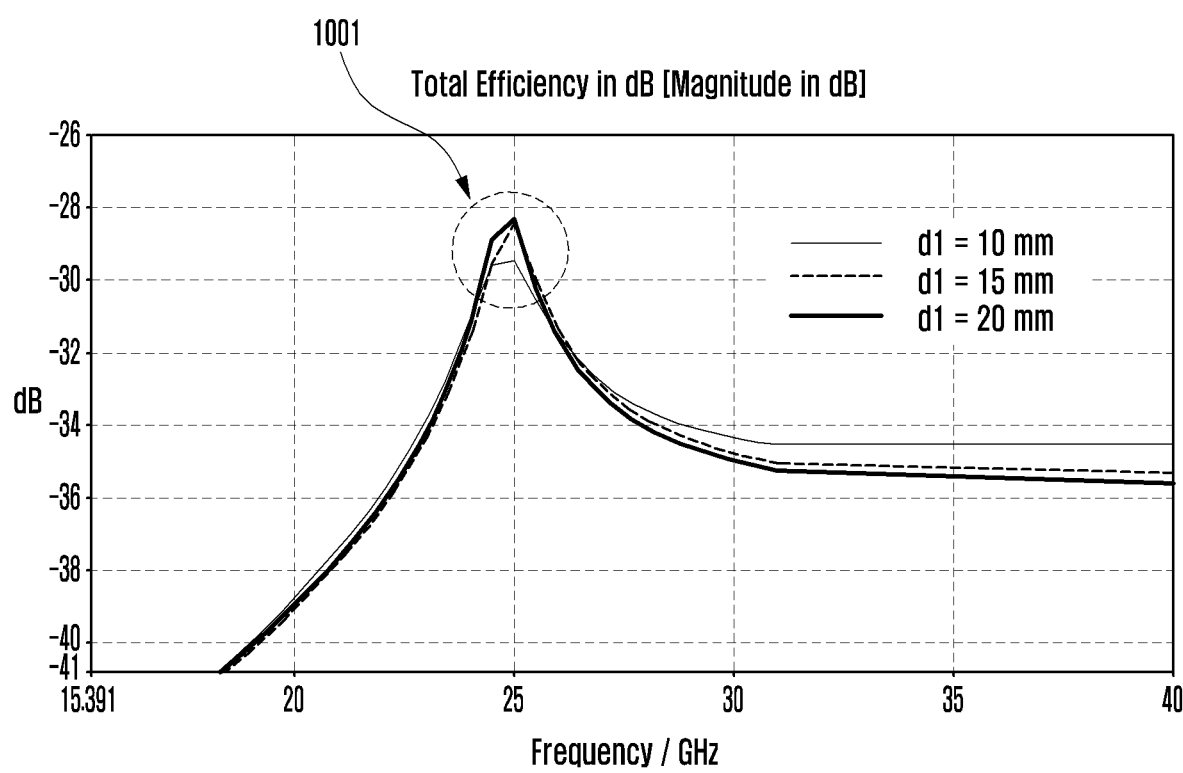
FIG. 10B is a graph comparing the performance of a second antenna, depending on a distance between a first antenna and a second antenna, according to various embodiments of the disclosure.

FIG. 10B is a graph comparing the performance of the second antenna 500, depending on a distance between the first antenna 400 and the second antenna 500, according to various embodiments of the disclosure.

Referring to FIG. 10B, as a result of comparing the performance of the second antenna 500 in a state where the separation distance d1 between the first antenna 400 and the second antenna 500 is set to, for example, 10 mm, 15 mm, and 20 mm, it can be seen that the greater the separation distance between the two antennas 400 and 500, the better the radiation performance of the second antenna 500 (area 1001).

FIG. 11A to FIG. 11D are side views of the antenna carrier including a conductive pattern of the first antenna having various line intervals according to various embodiments of the disclosure.

The conductive pattern 510 of the second antenna 500 according to an exemplary embodiment of the disclosure may be arranged such that the distances between the wound portions 511, 512, 513, and 514 which are wound multiple times around the antenna carrier 360 are substantially equal or different.

As illustrated in FIG. 11A to FIG. 11D, the wound portions 511, 512, 513, and 514 of the conductive pattern 510 having various designated distances d1, d2, d3, and d4 may be arranged on the designated side surface of the antenna carrier 360 adjacent to the first antenna 400. In another embodiment, the wound portions 511, 512, 513, and 514 may be arranged to have distances different from those illustrated above on the side surface other than the designated side surface of the antenna carrier 360.

Figure 11A:
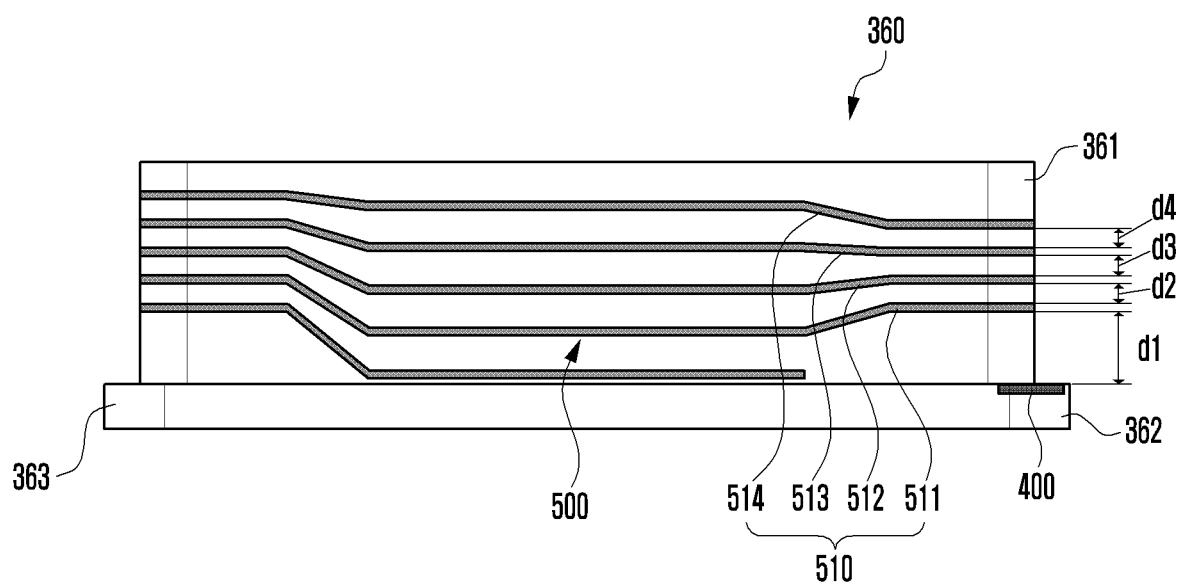
FIG. 11A to FIG. 11D are side views of an antenna carrier including a conductive pattern of a first antenna having various line intervals according to various embodiments of the disclosure.

Referring to FIG. 11A, the conductive pattern 510 according to an embodiment may be arranged such that the first distance d2 between the first wound portion 511 and the second wound portion 512, the second distance d3 between the second wound portion 512 and the third wound portion 513, and the third distance d4 between the third wound portion 513 and the fourth wound portion 514 are all substantially equal in a state where the first wound portion 511 is spaced apart by the basic separation distance d1 (e.g., 2.5 mm or greater) from the first antenna 400.

Figure 11B:
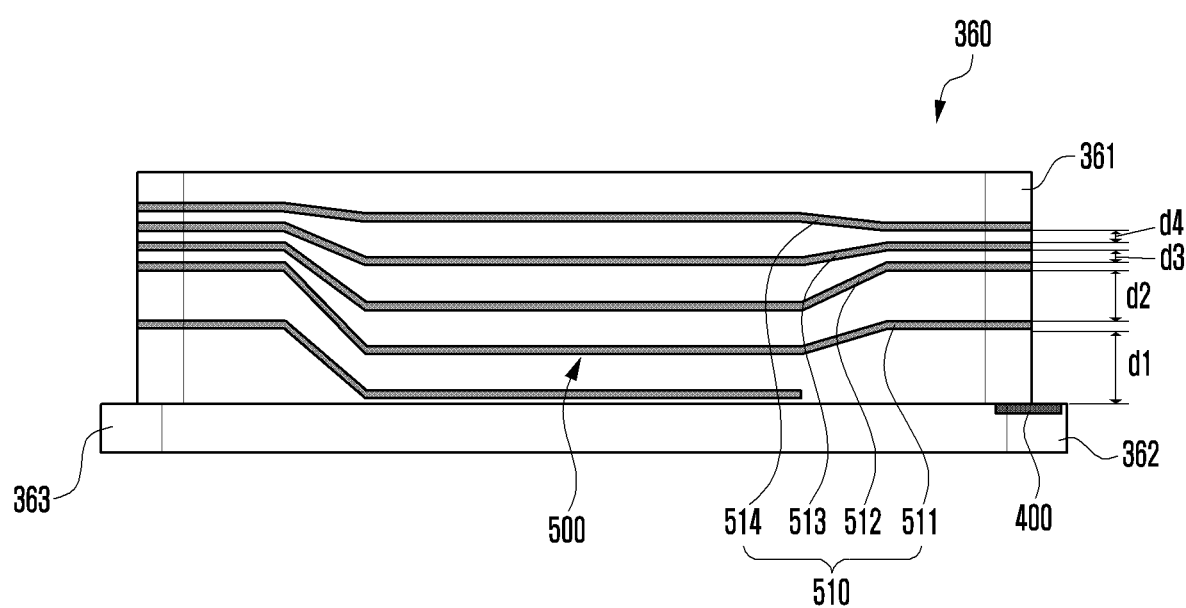

Referring to FIG. 11B, the conductive pattern 510 may be arranged such that the first distance d2 is larger than the second distance d3 and the third distance d4 which are identical in a state where the first wound portion 511 is spaced apart by the basic separation distance d1 (e.g., 2.5 mm or greater) from the first antenna 400.

Figure 11C:
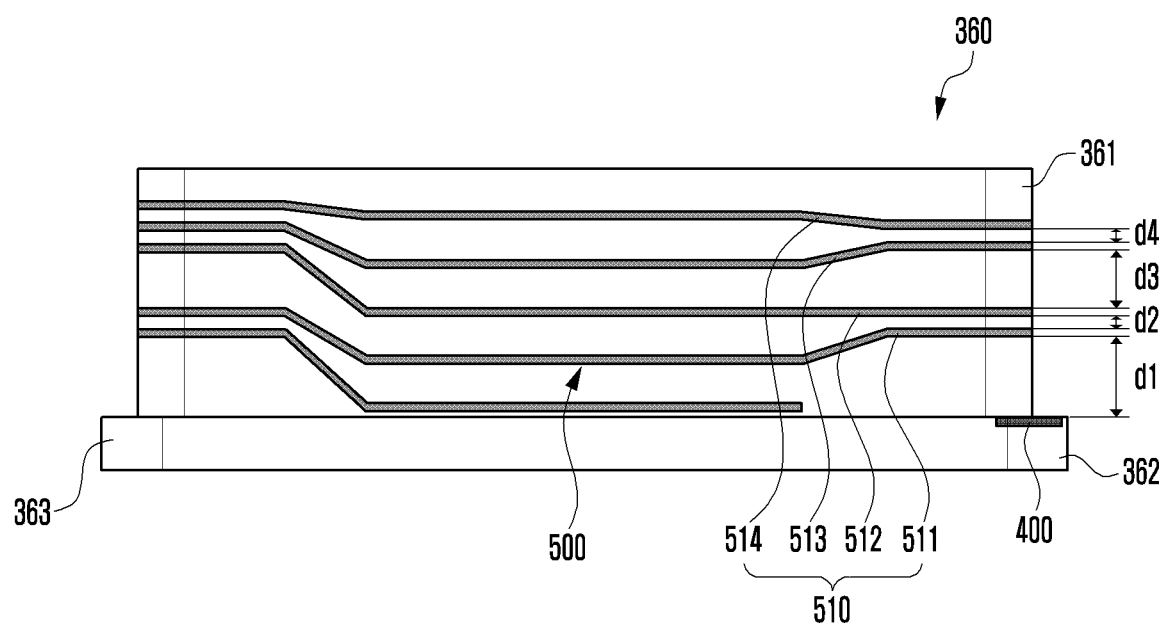

Referring to FIG. 11C, the conductive pattern 510 may be arranged such that the second distance d3 is larger than the first distance d2 and the third distance d4 which are substantially identical in a state where the first wound portion 511 is spaced apart by the basic separation distance d1 (e.g., 2.5 mm or greater) from the first antenna 400.

Figure 11D:
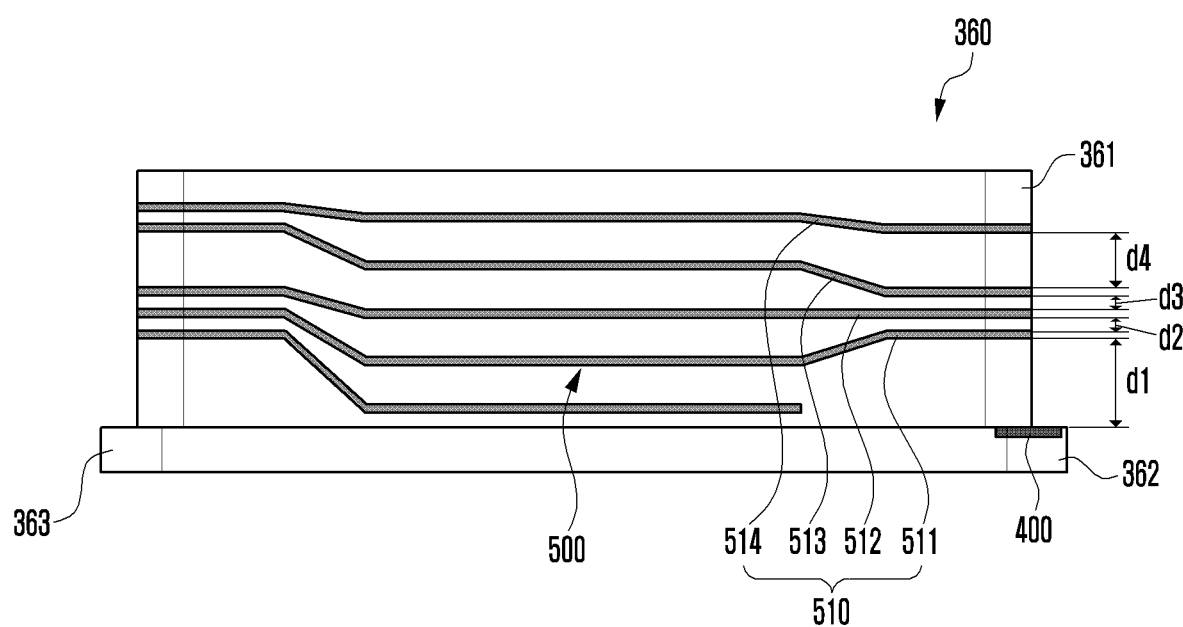

Referring to FIG. 11D, the conductive pattern 510 may be arranged such that the third distance d4 is larger than the first distance d2 and the second distance d3 which are substantially identical in a state where the first wound portion 511 is spaced apart by the basic separation distance d1 (e.g., 2.5 mm or greater) from the first antenna 400.

Figure 12:
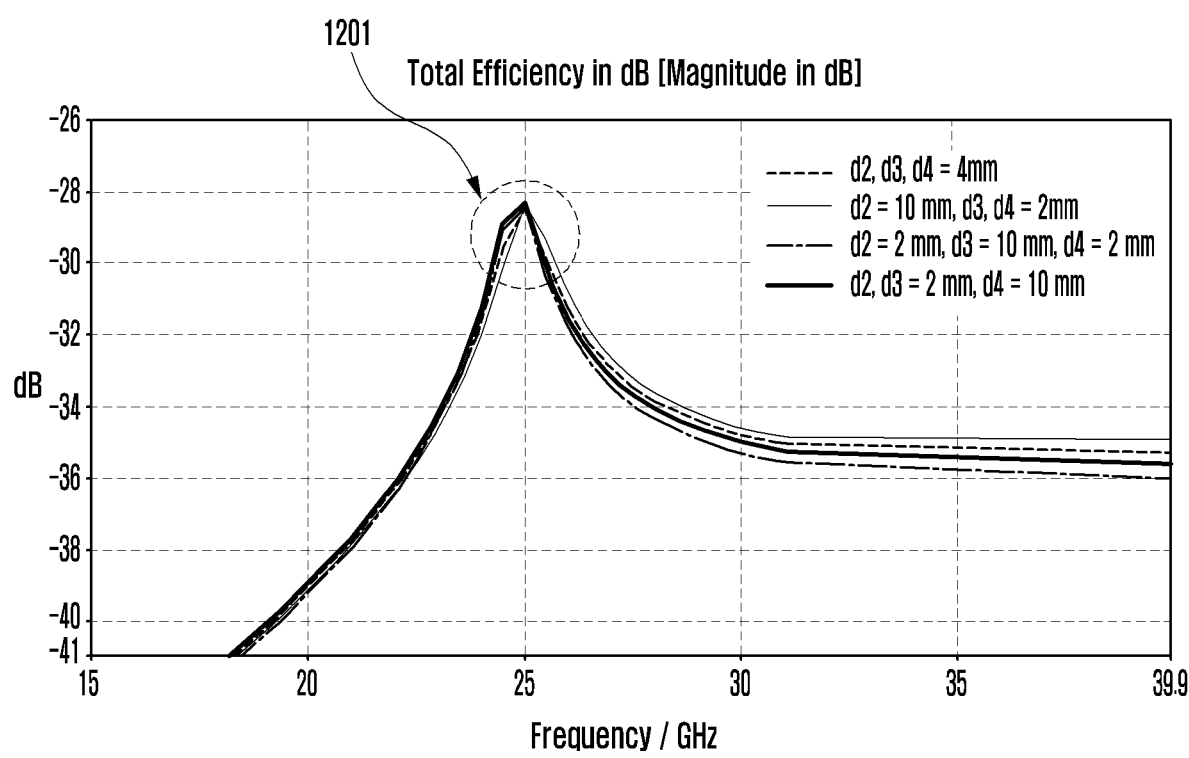
FIG. 12 is a graph comparing the radiation performance of a second antenna under conditions corresponding to FIG. 11A to FIG. 11D according to various embodiments of the disclosure.

FIG. 12 is a graph comparing the radiation performance of the second antenna 500 under conditions corresponding to FIG. 11A to FIG. 11D according to various embodiments of the disclosure.

Referring to FIG. 12, when comparing the condition, illustrated in FIG. 11A, in which the first distance d2, the second distance d3, and the third distance d4 are all set to 4 mm, the condition, illustrated in FIG. 11B, in which the first distance d2 is set to 10 mm and the second distance d3 and the third distance d4 are all set to 2 mm, the condition, illustrated in FIG. 1C, in which the first distance d2 and the third distance d4 are set to 2 mm and the second distance d3 is set to 10 mm, and the condition, illustrated in FIG. 11D, in which the first distance d2 and the second distance d3 are set to 2 mm and the third distance d4 is set to 10 mm, it can be seen that substantially the same radiation performance is exhibited under all the conditions. It may mean that, even when the wound portions of the conductive pattern 510, which are wound multiple times, are variously changed in consideration of the interference with peripheral antennas (e.g., the first antenna 400 or the third antenna 600) or the arrangement structure with peripheral electronic components, if the basic separation distance d1 is maintained, it may mean that the radiation performance of the second antenna 500 does not deteriorate.

According to various embodiments, an electronic device (e.g., the electronic device 300 in FIG. 3C) may include a front plate (e.g., the front plate 302 in FIG. 3C), a rear plate (e.g., the rear plate 311 in FIG. 3C) facing a direction opposite to the front plate, a side frame (e.g., the side frame 318 in FIG. 3C) surrounding an internal space between the front plate and the rear plate, a display (e.g., the display 301 in FIG. 3C) disposed in the internal space and visible from the outside through at least a part of the front plate, at least one first antenna (e.g., the first antenna 400 in FIG. 3C), a second antenna (e.g., the second antenna 500 in FIG. 3C) disposed in the internal space and wound multiple times and including a conductive pattern (e.g., the conductive pattern 510 in FIG. 3C) disposed to be spaced apart from the first antenna, a first wireless communication circuit (e.g., the wireless communication module 192 in FIG. 1) configured to transmit or receive a wireless signal in a first frequency band via the at least one first antenna, and a second wireless communication circuit (e.g., the wireless communication module 192 in FIG. 1) configured to transmit or receive a wireless signal in a second frequency band via the second antenna, wherein the at least one first antenna may be spaced apart by a distance (e.g., the separation distance d1 of 5b in FIG. 3C) from the conductive pattern.

An electronic device according to an exemplary embodiment of the disclosure may provide multiple antennas capable of using a high frequency, an ultra-high frequency for mobile communication, or a millimeter wave together such that wireless services in various frequency bands can be used by a single electronic device, thereby providing convenience in using the electronic device.

The conductive pattern comprises a first wound portion, a second wound portion, a third wound portion and a fourth wound portion which are wound along the side surface and sequentially spaced apart from one another, and wherein a distance between two adjacent wound portions among the first wound portion, the second wound portion, the third wound portion and the fourth wound portion is partially changed along the side surface.

The conductive pattern comprises a first wound portion, a second wound portion, a third wound portion and a fourth wound portion which are wound along the side surface and sequentially spaced apart from one another, and wherein a first distance between the first wound portion and the second wound portion, a second distance between the second wound portion and the third wound portion, and a third distance between the third wound portion and the fourth wound portion are substantially the same with each other.

The conductive pattern comprises a first wound portion, a second wound portion, a third wound portion and a fourth wound portion which are wound along the side surface and sequentially spaced apart from one another, and wherein a first distance between the first wound portion and the second wound portion is larger than each of a second distance between the second wound portion and the third wound portion and a third distance between the third wound portion and the fourth wound portion.

The conductive pattern comprises a first wound portion, a second wound portion, a third wound portion and a fourth wound portion which are wound along the side surface and sequentially spaced apart from one another, and wherein a second distance between the second wound portion and the third wound portion is larger than each of a first distance between the first wound portion and the second wound portion and a third distance between the third wound portion and the fourth wound portion.

The conductive pattern comprises a first wound portion, a second wound portion, a third wound portion and a fourth wound portion which are wound along the side surface and sequentially spaced apart from one another, and wherein a third distance between the third wound portion and the fourth wound portion is larger than each of a first distance between the first wound portion and the second wound portion and a second distance between the second wound portion and the third wound portion.

According to various embodiments, an electronic device (e.g., the electronic device 300 in FIG. 3C) may include a front plate (e.g., the front plate 302 in FIG. 3C), a rear plate (e.g., the rear plate 311 in FIG. 3C) facing a direction opposite to the front plate, a side frame (e.g., the side frame 318 in FIG. 3C) surrounding an internal space between the front plate and the rear plate, a display (e.g., the display 301 in FIG. 3C) disposed in the internal space to be visible from the outside through at least a part of the front plate, a printed circuit board (e.g., the printed circuit board 340 in FIG. 3C) disposed between the display and the rear plate, an antenna carrier (e.g., the antenna carrier 360 in FIG. 3C) which is disposed between the printed circuit board and the rear plate and includes a first surface (e.g., the first surface 3601 in FIG. 3C) facing the front plate, a second surface (e.g., the second surface 3602 in FIG. 3C) facing a direction opposite to the first surface, and a side surface (e.g., the side surface 3603 in FIG. 3C) surrounding a space between the first surface and the second surface, at least one first antenna (e.g., the first antenna 400 in FIG. 3C) disposed in at least a portion of the antenna carrier, a second antenna (e.g., the second antenna 500 in FIG. 3C) which is disposed to be wound multiple times via a side surface of the antenna carrier and is disposed to be spaced apart from the first antenna, at least one third antenna (e.g., the third antenna 600 in FIG. 3C) disposed in at least a portion of the antenna carrier to be spaced apart from the second antenna and the first antenna, a first wireless communication circuit (e.g., the wireless communication module 192 in FIG. 1) which is disposed on the printed circuit board and is configured to transmit and/or receive a wireless signal in a first frequency band via the at least one first antenna, a second wireless communication circuit (e.g., the wireless communication module 192 in FIG. 1) which is disposed on the printed circuit board and is configured to transmit and/or receive a wireless signal in a second frequency band via the second antenna, and a third wireless communication circuit (e.g., the wireless communication module 192 in FIG. 1) which is disposed in the internal space and is configured to transmit and/or receive a wireless signal in a third frequency band via the at least one third antenna, wherein the at least one first antenna and the conductive pattern may be arranged to be spaced a designated distance apart from each other.

According to various embodiments, the first wireless communication circuit may be configured to transmit and/or receive a wireless signal in a range of 400-3000 MHz via the at least one first antenna, the second wireless communication circuit may be configured to transmit or receive a wireless signal in a range of 3-30 MHz via the second antenna, and the third wireless communication circuit may be configured to transmit and/or receive a wireless signal in a range of about 3-100 GHz via the at least one third antenna.

According to various embodiments, the distance may include a spaced linear distance of at least 2.5 mm.

According to various embodiments, the antenna carrier may include at least one flange (e.g., the flanges 362 and 363 in FIG. 4A) extending outwards and the at least one first antenna and the at least one third antenna may be arranged on the at least one flange.

The embodiments of the disclosure disclosed in the specification and drawings are merely provided for specific examples to easily explain the technical content according to the embodiments of the disclosure and help the understanding of the embodiments of the disclosure, and are not intended to limit the scope of the embodiments of the disclosure. Therefore, the scope of the various embodiments of the disclosure should be construed that all changes or modified forms derived based on the technical idea of various embodiments of the disclosure in addition to the embodiments disclosed herein are included in the scope of the various embodiments of the disclosure.

The invention claimed is:

1. An electronic device comprising:
    a housing;
    a display disposed in the housing, the display being visible from an outside of the electronic device through at least a part of the housing;
    an antenna carrier disposed in the housing;
    at least one first antenna disposed on at least a portion of the antenna carrier;
    a second antenna disposed on the antenna carrier and comprising a conductive pattern, the conductive pattern being wound multiple times along an edge of the antenna carrier;
    a first wireless communication circuit configured to transmit or receive a wireless signal in a first frequency band via the at least one first antenna; and
    a second wireless communication circuit configured to transmit or receive a wireless signal in a second frequency band via the second antenna,
    wherein the antenna carrier comprises at least one flange protruding from at least a part of the edge of the antenna carrier,
    wherein the at least one first antenna is disposed on the at least one flange, and
    wherein the at least one first antenna is spaced apart by a distance from the conductive pattern.

2. The electronic device of claim 1, wherein the first wireless communication circuit is configured to transmit or receive a wireless signal in a range of 400 MHZ-3000 MHz via the at least one first antenna.

3. The electronic device of claim 1, wherein the distance is at least 2.5 mm.

4. The electronic device of claim 1, wherein the second wireless communication circuit is configured to transmit or receive a wireless signal in a range of 3 MHz-30 MHz via the second antenna.

5. The electronic device of claim 1, further comprising:
    at least one third antenna disposed on the antenna carrier and spaced apart from the second antenna; and
    a third wireless communication circuit configured to transmit or receive a wireless signal in a third frequency band via the at least one third antenna.

6. The electronic device of claim 5, wherein the third wireless communication circuit is configured to transmit or receive a wireless signal in a range of 3 GHZ-100 GHz via the at least one third antenna.

7. The electronic device of claim 6, wherein the third antenna comprises:
    a substrate; and
    a plurality of antenna elements arranged at intervals on the substrate and configured to form a beam pattern in a direction.

8. The electronic device of claim 6, wherein the second antenna further comprises a portion formed via at least a part of the conductive pattern and spaced apart by a distance from the at least one third antenna.

9. The electronic device of claim 1, wherein the antenna carrier comprises a body including a first surface facing a first direction, a second surface facing a direction opposite to the first direction, and a side surface surrounding a space between the first surface and the second surface, and
    wherein the conductive pattern is wound multiple times along at least a part of the side surface.

10. The electronic device of claim 9, wherein the conductive pattern extends to at least a part of the first surface and the second surface from the side surface.

11. The electronic device of claim 9, wherein the at least one flange protrudes from at least a part of the body.

12. The electronic device of claim 1, wherein the at least one first antenna comprises at least one laser direct structuring (LDS) pattern disposed on the at least one flange.

13. The electronic device of claim 1, wherein the conductive pattern comprises a plurality of wound portions, and
    wherein at least two lines of respective lines of the plurality of wound portions have intervals which are identical or not identical to each other.

14. An electronic device comprising:
    a housing including a front plate, a rear plate facing a direction opposite to the front plate, a side frame surrounding an internal space between the front plate and the rear plate;
    a display disposed in the internal space, the display being visible from the outside through at least a part of the front plate;
    a printed circuit board disposed between the display and the rear plate;
    an antenna carrier disposed between the printed circuit board and the rear plate and including a first surface facing the front plate, a second surface facing a direction opposite to the first surface, and a side surface surrounding a space between the first surface and the second surface;
    at least one first antenna disposed in at least a portion of the antenna carrier;
    a second antenna disposed to be wound multiple times via a side surface of the antenna carrier and is disposed to be spaced apart from the first antenna;
    at least one third antenna disposed in at least a portion of the antenna carrier to be spaced apart from the second antenna and the first antenna;
    a first wireless communication circuit disposed on the printed circuit board and is configured to transmit or receive a wireless signal in a first frequency band via the at least one first antenna;
    a second wireless communication circuit disposed on the printed circuit board and is configured to transmit or receive a wireless signal in a second frequency band via the second antenna; and
    a third wireless communication circuit which is disposed in the internal space and is configured to transmit or receive a wireless signal in a third frequency band via the at least one third antenna,
    wherein the antenna carrier comprises at least one flange protruding from at least a part of an edge of the antenna carrier,
    wherein the at least one first antenna is disposed on the at least one flange, and
    wherein the at least one first antenna is spaced apart by a distance from the conductive pattern.

15. The electronic device of claim 14, wherein the first wireless communication circuit is configured to transmit or receive a wireless signal in a range of 400-3000 MHz via the at least one first antenna,
    wherein the second wireless communication circuit is configured to transmit or receive a wireless signal in a range of 3-30 MHz via the second antenna, and
    wherein the third wireless communication circuit may be configured to transmit and/or receive a wireless signal in a range of 3-100 GHz via the at least one third antenna.

16. The electronic device of claim 14, wherein the distance includes a spaced linear distance of at least 2.5 mm.

17. The electronic device of claim 14,
 wherein the at least one third antenna is arranged on the at least one flange.

18. The electronic device of claim 14, wherein the front plate faces in a first direction, and the at least one flange extends from the side surface in a second direction perpendicular to the first direction, and
 wherein the conductive pattern comprises a plurality of wound portions extending along the side surface and extending on a part of the first surface from the side surface in a third direction perpendicular to each of the first direction and the second direction.

* * * * *